United States Patent [19]

Hashimoto et al.

[11] Patent Number: 4,977,608

[45] Date of Patent: Dec. 11, 1990

[54] RADIO COMMUNICATION SYSTEM

[75] Inventors: Kiroyuki Hashimoto; Nobuo Iizuka; Suzuki Akira, all of Tokyo, Japan

[73] Assignee: Kabushiki Kaisha Kenwood, Tokyo, Japan

[21] Appl. No.: 462,336

[22] Filed: Jan. 2, 1990

Related U.S. Application Data

[60] Continuation of Ser. No. 299,026, Jan. 19, 1989, abandoned, which is a division of Ser. No. 113,355, Oct. 28, 1987, Pat. No. 4,850,030, which is a continuation of Ser. No. 830,583, Feb. 7, 1986, abandoned.

[30] Foreign Application Priority Data

Jun. 23, 1984 [JP] Japan .................. 59-128451

[51] Int. Cl.$^5$ .............................................. H04B 1/50
[52] U.S. Cl. ...................................... 425/62; 455/76; 455/68; 455/34
[58] Field of Search ................ 455/62, 34, 68, 69, 455/70, 53, 49, 54, 33, 76, 77, 88

[56] References Cited

U.S. PATENT DOCUMENTS 4,392,242  7/1983  Kai .......................................... 455/33
4,597,104  6/1984  Ohki et al. ........................... 455/62 X
4,736,453  4/1988  Schloemer ............................. 455/33

FOREIGN PATENT DOCUMENTS 52-113117  9/1977  Japan .
53-39128   9/1978  Japan .
59-72829   4/1984  Japan .

Primary Examiner—Douglas W. Olms
Assistant Examiner—Ralph Smith
Attorney, Agent, or Firm—Sixbey, Friedman, Leedom & Ferguson

[57] ABSTRACT

In the radio communication system for performing a communication in the idle channel selected from a plurality of frequency channels, the originating call station transmits the station identification code to specify the distant station together with the idle channel data to be actually communicated, and the distant station designated by the station identification code shifts to the designated idle channel, and the communication is executed between two stations. During communication in a certain channel between two stations, in the case where a radio interference occurs in this channel and it is intended to shift to other channel, one station transmits the other channel data in the communication channel and the other station receives it, and the communication is continued each other in the other channel.

2 Claims, 23 Drawing Sheets

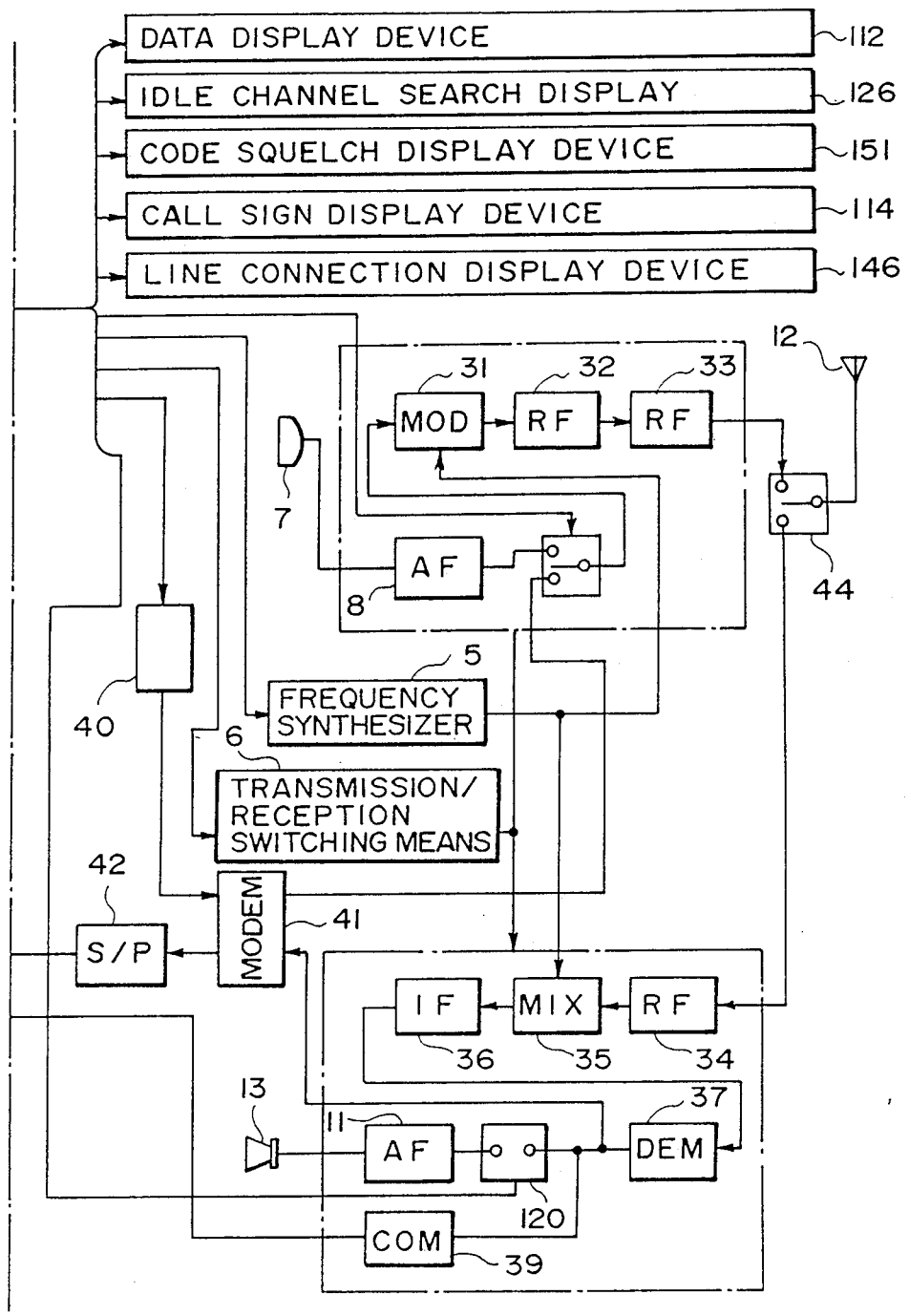
F I G. 5C

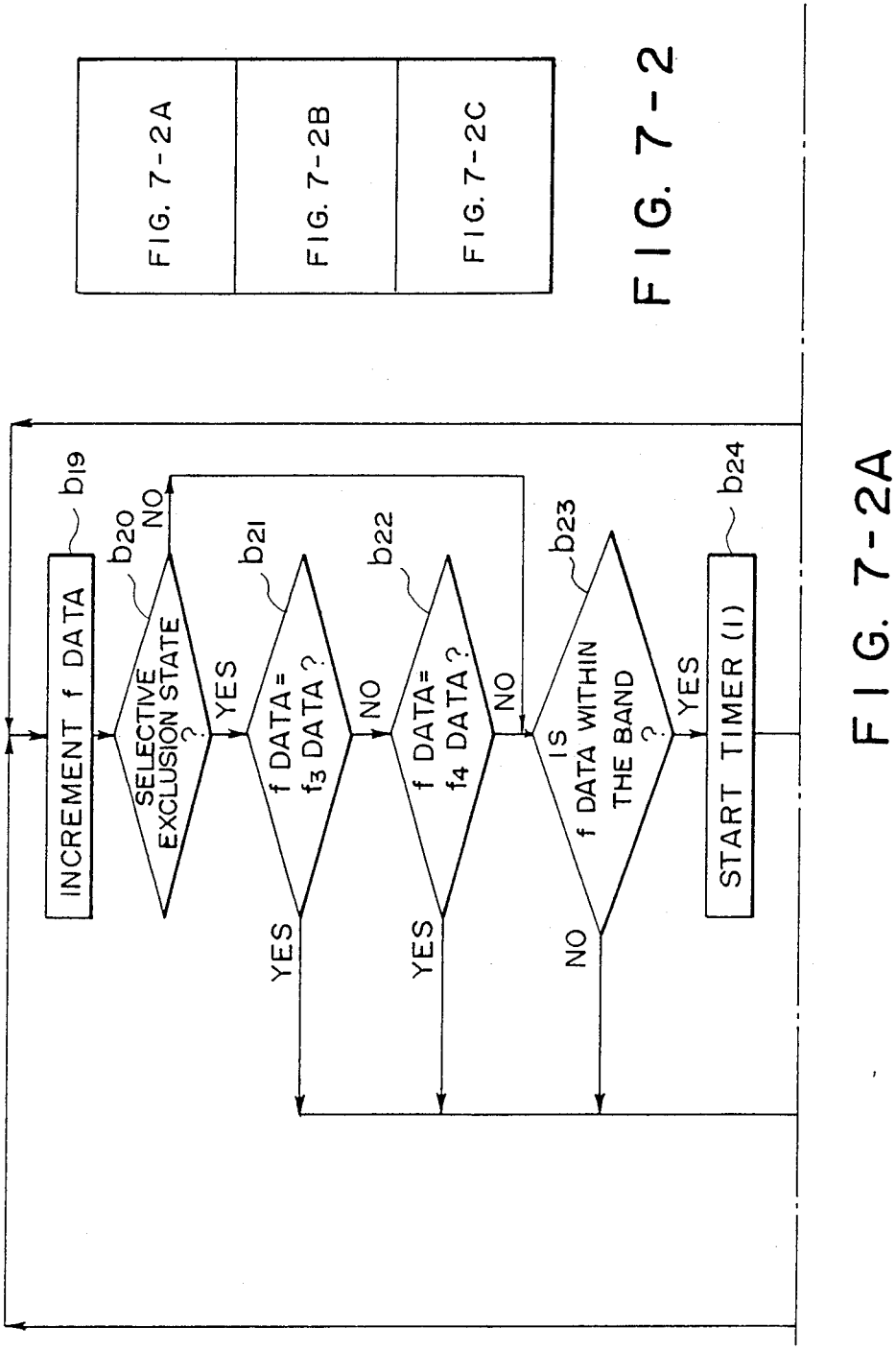

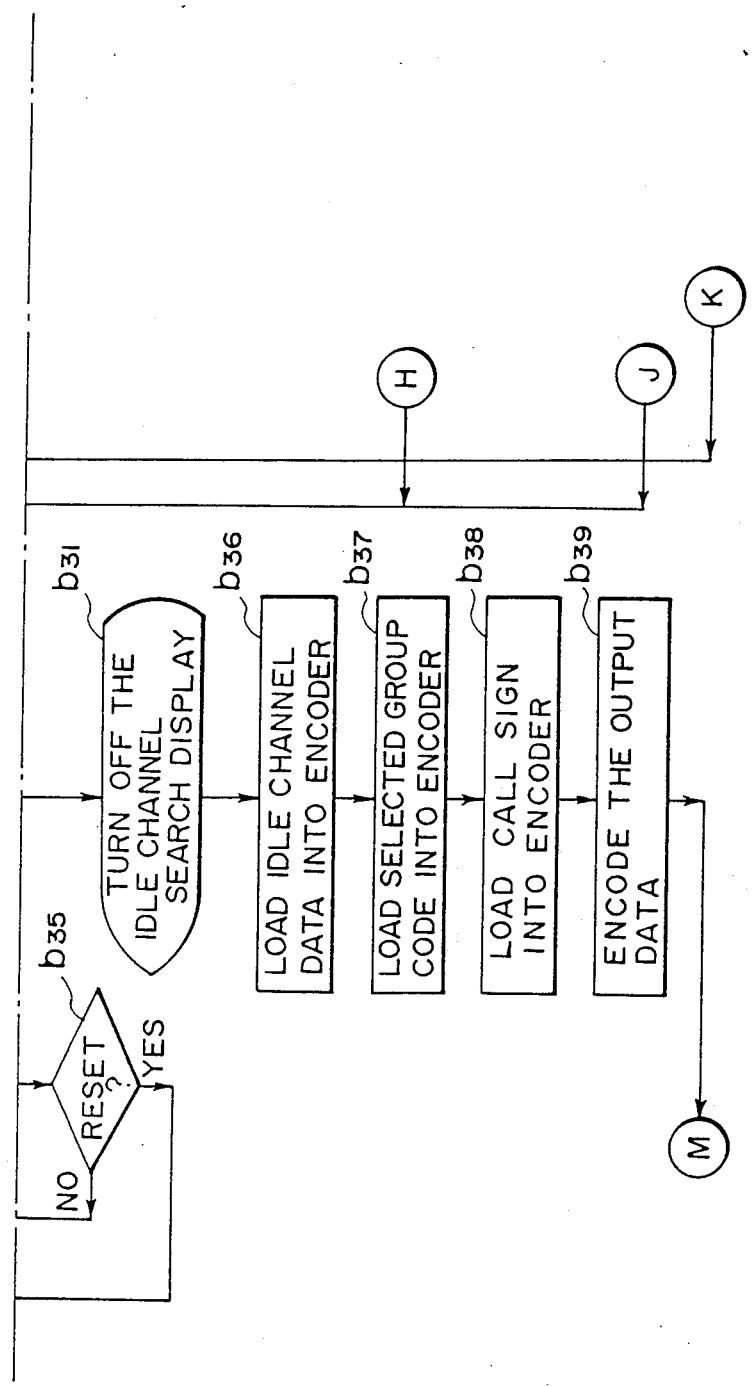

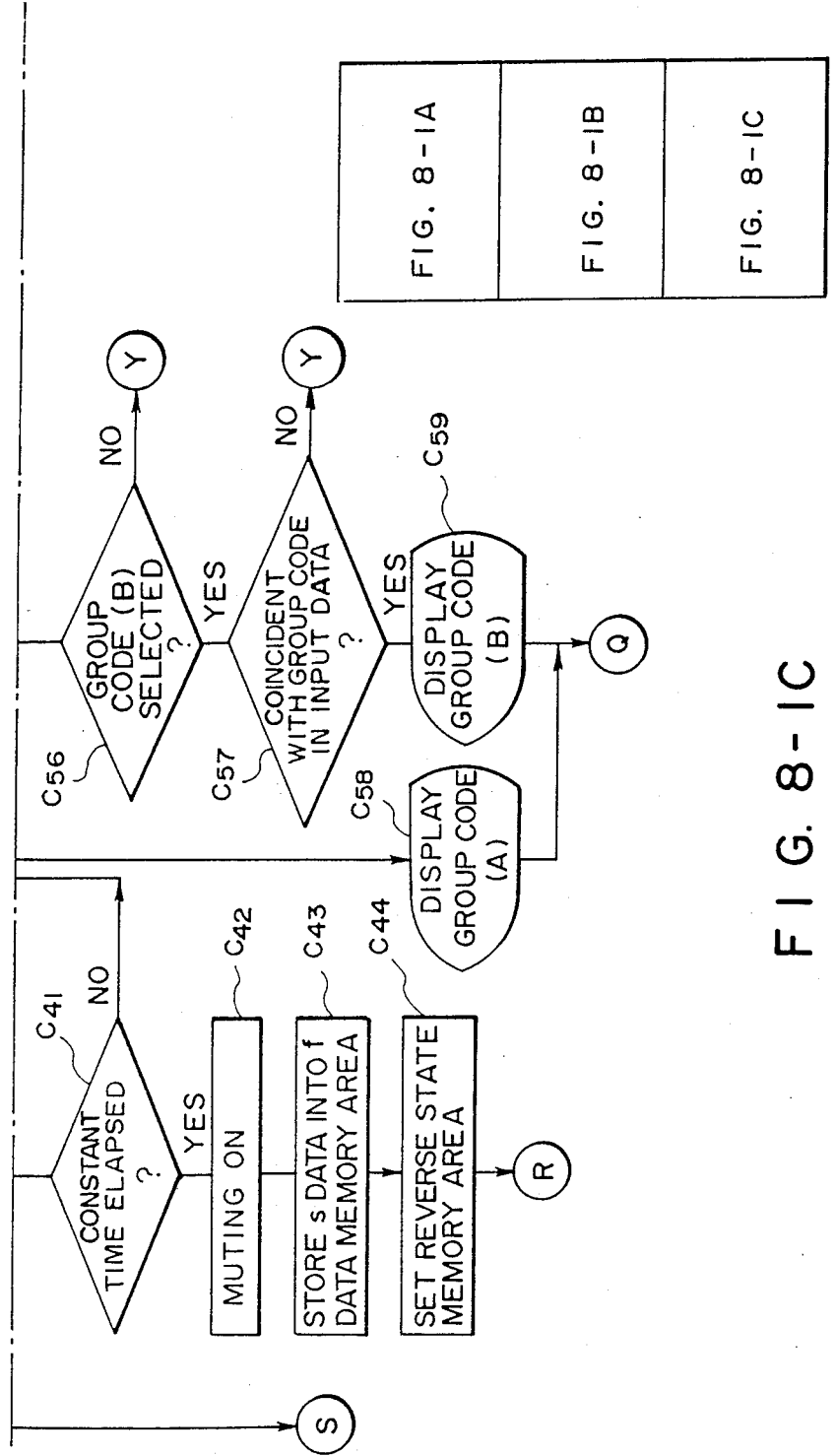

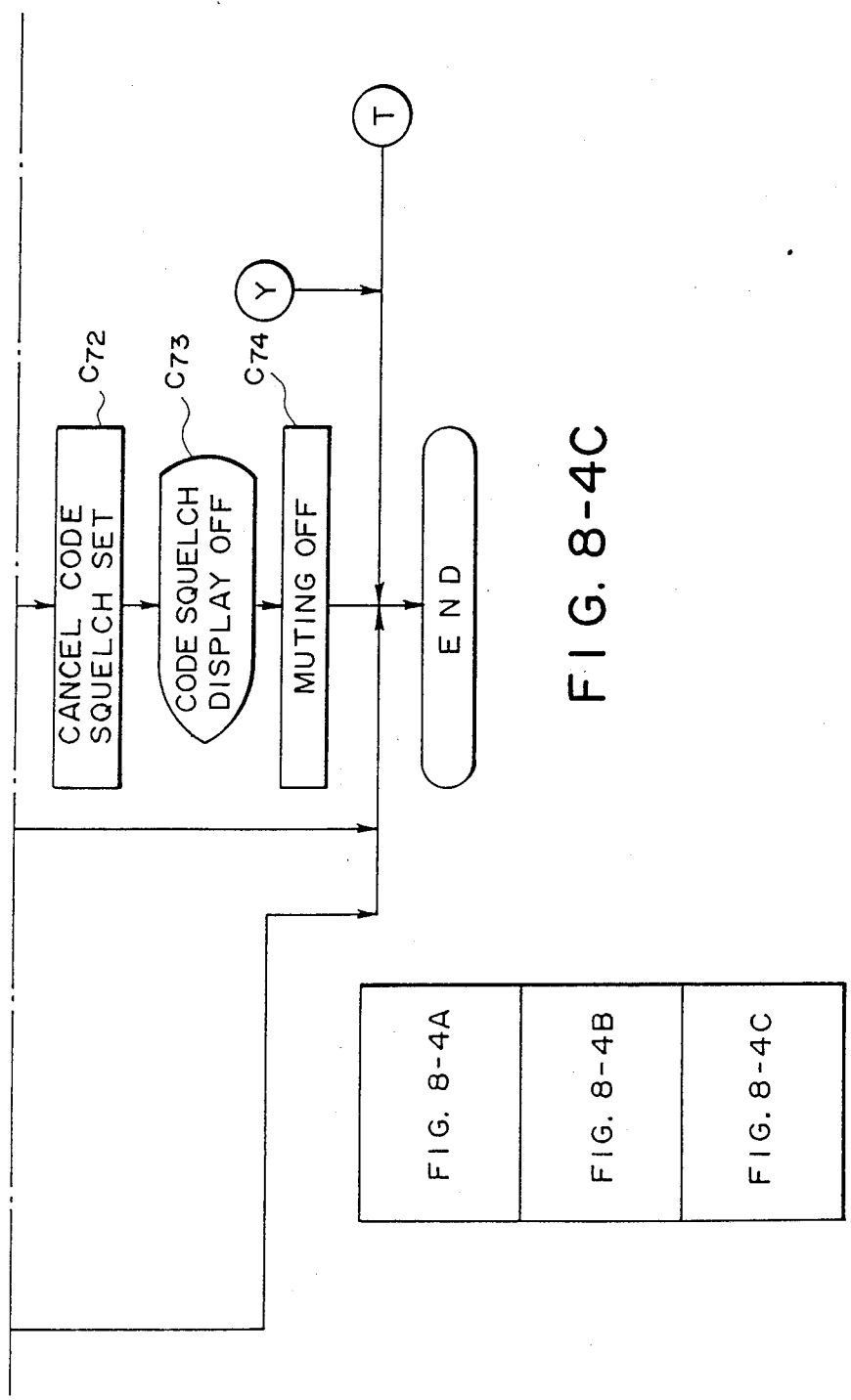

RADIO COMMUNICATION SYSTEM

This application is a continuation of application Ser. No. 07/299,026, filed Jan. 19, 1989, now abandoned which itself was a divisional of application Ser. No. 07/113,355, filed Oct. 18, 1987, now U.S. Pat. No. 4,850,030, which was a continuation of application Ser. No. 06/830,583, filed Feb. 7, 1986, now abandoned.

TECHNICAL FIELD

The present invention relates to a radio communication system and, more particularly, to an amateur radio communication system.

BACKGROUND ART

The conventional FM communication of an amateur radio station is generally based on a method whereby the idle frequency (idle channel) is found out from the calling frequencies (calling channels) and this idle frequency is informed by a voice to unspecified distant stations and the mutual stations which desire the communication shift to this idle frequency and perform the communication. These operations are manually performed.

DISCLOSURE OF INVENTION

According to this system, a series of those operations are automated by the digital technology in the following manner. The idle channel is automatically found out. An instruction signal to perform the operation to shift the frequency of the radio transceiver on the distant side to the idle channel is transmitted from this side and at the same time, this side also promptly shifts the frequency to this idle channel. However, since the calling channel is used by many stations and the signal to instruct the channel shift is unnecessary for the other unconcerned stations, a digital control code to specify the distant stations, a digital control code to specify the distant station to be communicated with this station is set (this digital control code consists of arbitrary five-digit number to mutually identify the objective stations to be communicated and is what is called a "password" which is arbitrarily determined among fellows, "employee code", "position code", or the like). The instruction signal to shift to the idle channel is sent to only the station which transmitted the coincident digital control code. Then, both of the distant station and this station shift to the idle channel and can perform the communication.

The radio transceiver used in this system and disclosed as an embodiment also has the following functions.

The function (skip channel) to avoid the channels (frequencies) which were preliminarily stored in a memory of the radio transceiver and to select the channels other than those stored channels when the idle channel is found out. With this function, it is possible to avoid the shift to a channel which is perhaps busy, such as a club channel or the like.

The function to select the idle channel from among a plurality of channels (frequencies) which were preliminarily stored in a memory of the radio transceiver when the idle channel is searched. With this function, it is easy to shift to the channel which is frequency used by this side.

The function in which although the line was automatically connected and the communication was performed, this channel soon becomes difficult to be used in the best condition due to radio interference or the like, so that the line is automatically connected to another idle channel from that channel. With this function, in the case where the control channel is set to the special channel, the communication is concentrated to this channel; therefore, by setting the current communicating channel to the start channel, the communication jam can be avoided. If the radio interference occurred during communication, in the case where the setting of the control channel which can shift to the idle channel from that frequency to the special channel (for example, call channel) is not admitted, this function is effective as a countermeasure for such a case.

The function (reverse) to alternately shift the calling channel and the selected idle channel. With this function, in the case where the distant station cannot be connected at the time of the channel link, the channel can be returned to the start channel and the channel shift operation can be again performed. The channels can be easily manually switched and it is possible to manually shift to the idle channel for the distant station which is not provided with the apparatus according to this system.

The function in which although the digital code which was set to call the distant side is apparently the code by which this side is called upon reception, this side can be also called even by (a plurality of) the other codes stored in the memory of the radio transceiver on this side. There is a generality in the case where the station is called by a plurality of codes rather than the case where it is called by one group code (this function is convenient when there are a plurality of group code stations which are determined for a plurality of club stations; the waiting and calling of a plurality of stations can be performed).

The function in which the transmission can be executed only in the state in which the code squelch (the function such that the voice of the distant station can be heard only when the code number set on this side coincides with the code number set in the distant station) is set upon reception and when a transmission switch (PTT switch) is pressed to transmit, the squelch is first cancelled and all can be received. With this function, it is possible to promptly cancel the channel at hand and the use state of this channel can be certainly confirmed before transmission. Unless the code squelch is cancelled, the voice of the station of the group code or conventional set cannot be heard.

The common use as the switch for the call operation and the switch for the recall operation which is used in the case where the line of the distant station cannot be automatically connected by the call operation, or the like. The common use of the switches in this way can reduce the number of switches. Although the actual originating call operation and reoriginating call operation differ, both of these operations are the calling operations for the user; therefore, the operations are simplified by using the same switch for those operations.

The function in which when the idle channel is being searched, the execution of this operation is displayed by a light, sound, or the like. With this function, it is possible to clarify that the idle channel is being searched.

The function in which when an arbitrary call sign (of a radio station to be used) for automatic transmission of the call sign is set, alphabets are replaced by numerals of two digits and can be inputted by a keyboard switch to set the digital code. According to the method whereby alphabetic characters and numerals are directly inputted or the method whereby they are inputted by the hexadecimal ASCII code, many keys are needed and the display corresponding thereto must be performed. However, by converting into the decimal ASCII code, it is sufficient to use only numerals of 0 to 9 and the display can also become easy.

The function in that the transmission can be performed only when the call sign for automatic transmission of the call sign is inputted. With this function, it is possible to prevent the originating call in the case where the input of the call sign code of this station was forgot.

The function in which the call sign which was automatically transmitted from the distant station is received and interpreted and the call sign is displayed by the display device. The data which is sent as the ASCII code can be observed as the call sign by the eyes and the distant station can be momentarily identified.

The lock function in which when the display representing that the line is connected to the distant station is indicated, even if this station is called from another station having the same digital code, the line is not connected to this another station (the line is still connected to the station to which the line was first connected). With this function, it is possible to cope with the interference of reception.

The function to store the frequency of the channel to be locked.

The function to forcedly stop the search of the idle channel. Unless the idle channel is found out, the program of the apparatus enters the infinite loop; therefore, this is cancelled at a proper timing.

The function in which although the transmission cannot be performed ordinarily when no idle channel is found out, the transmission can be forcedly executed. When it is difficult to expect that the control or originating call channel becomes idle, the control signal can be transmitted sometimes.

DETAILED DESCRIPTION OF THE EMBODIMENT

Figure 1:
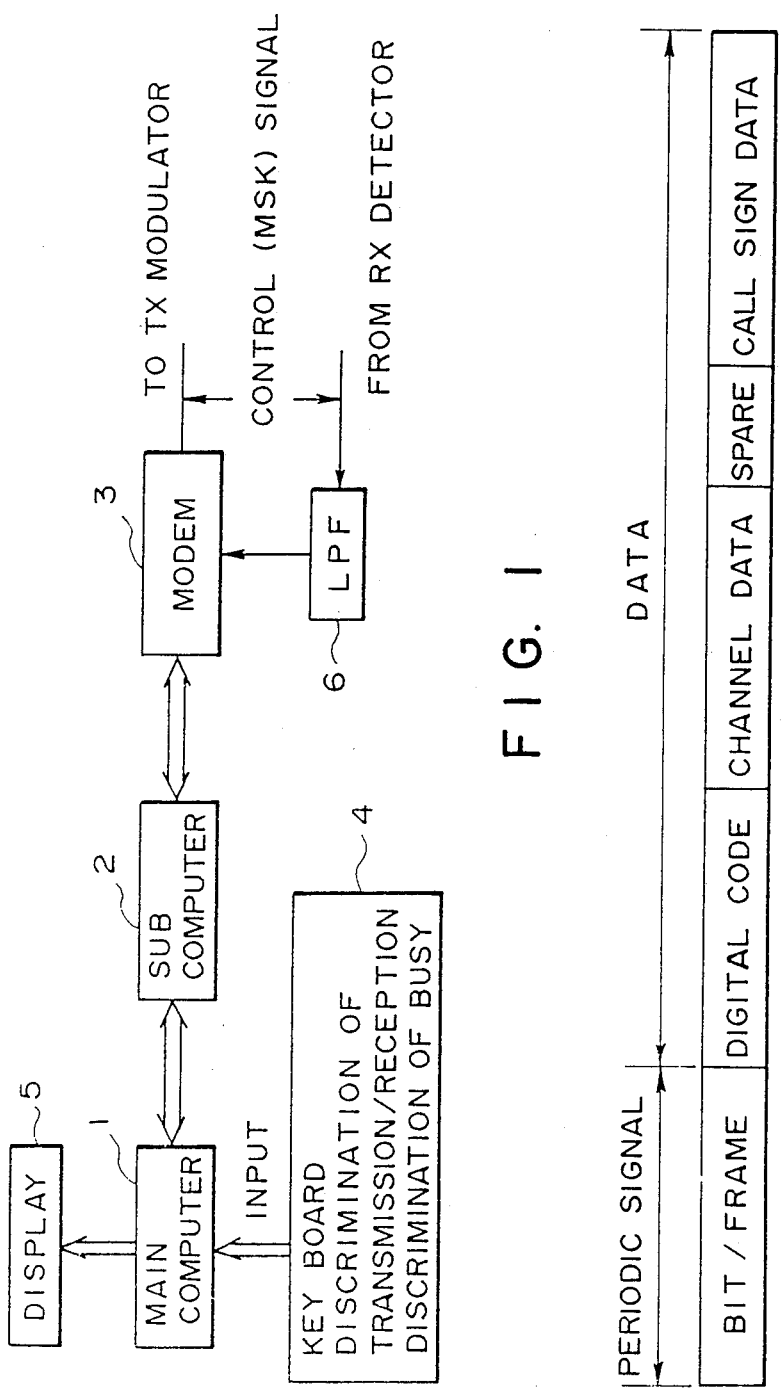
FIG. 1 a diagram showing an example of a fundamental arrangement of a radio transceiver which is used in the system of the present invention.

FIG. 1 shows an example of a fundamental arrangement of a radio transceiver for use in the present system. The input/output processes and general functions of the transceiver are controlled by a main computer 1. The data process is executed by a subcomputer 2. In a modem 3 for data transmission of the MSK (Minimum Shift Keying) system, a modulator section outputs an MSK signal while synchronizing a data signal necessary for transmission with a clock as an interface of the digital data process. A demodulator section demodulates the data signal from the MSK signal received and also reproduces the clock synchronized with the data signal. A signal to operate the transceiver is inputted from a keyboard 4 and the operation state of the transceiver is displayed on a display 5.

Figure 2:
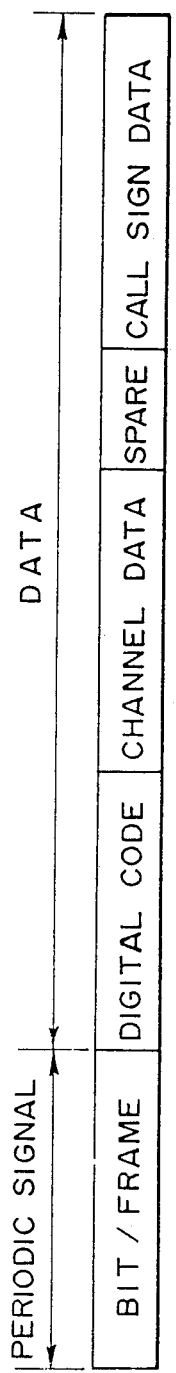
FIG. 2 is a diagram showing an example of an arrangement of a control signal according to the system of the invention.

FIG. 2 shows an example of an arrangement of a control signal to transmit the necessary information to the distant station which is used in the present system. The data information in this signal is particularly important and uses error correction based on the Hargelbarger system, thereby improving errors due to the influence by the noise or the like.

① Bit/frame sync signal ... Discriminates the noise and signal upon data communication or the like from the signal for the present system. ② Digital code data ... The number which is constituted by numerals of five digits and is used to identify whether the station is the objective distant station or not. ③ Idle channel data ... The frequency data of the idle channel and the information data from 100 MHz to 1 kHz. ④ Call sign data ... The information data of six characters of the call sign in combination of numerals and alphabets. The spare data is also provided in consideration of future development of the system. This control signal is transmitted at a high speed of 1200 baud, so that its transmission time is so short to be about 0.2 second and will hardly influence on the ordinary communication. However, when this signal is received, it is heard as a peculiar sound like "piro piro".

As an example of setting the digital code and inputting the call sign, the digital code assumes the number of five digits by sequentially setting numerals of 0 to 9. The call sign is inputted using the ASCII code by expressing it as the decimal number instead of the hexadecimal number of two digits so that it can be easily inputted. The following table shows the correspondence among the codes which are expressed by decimal number and the characters which are expressed by these codes. For example, although a character of "J" is expressed as &H4A by the ASCII code, it is expressed as 74={4×16+A(10)} by the decimal number. This code is converted to the ASCII code in the set and is transmitted.

TABLE

| | | | |
|---|---|---|---|
| A : 65 | B : 66 | C : 67 | D : 68 |
| E : 69 | F : 70 | G : 71 | H : 72 |
| I : 73 | J : 74 | K : 75 | L : 76 |
| M : 77 | N : 78 | O : 79 | P : 80 |
| Q : 81 | R : 82 | S : 83 | T : 84 |
| U : 85 | V : 86 | W : 87 | X : 88 |
| Y : 89 | Z : 90 | SPACE : 32 | |
| 0 : 48 | 1 : 49 | 2 : 50 | 3 : 51 |
| 4 : 52 | 5 : 53 | 6 : 54 | 7 : 55 |
| 8 : 56 | 9 : 57 | | |

Figure 3:
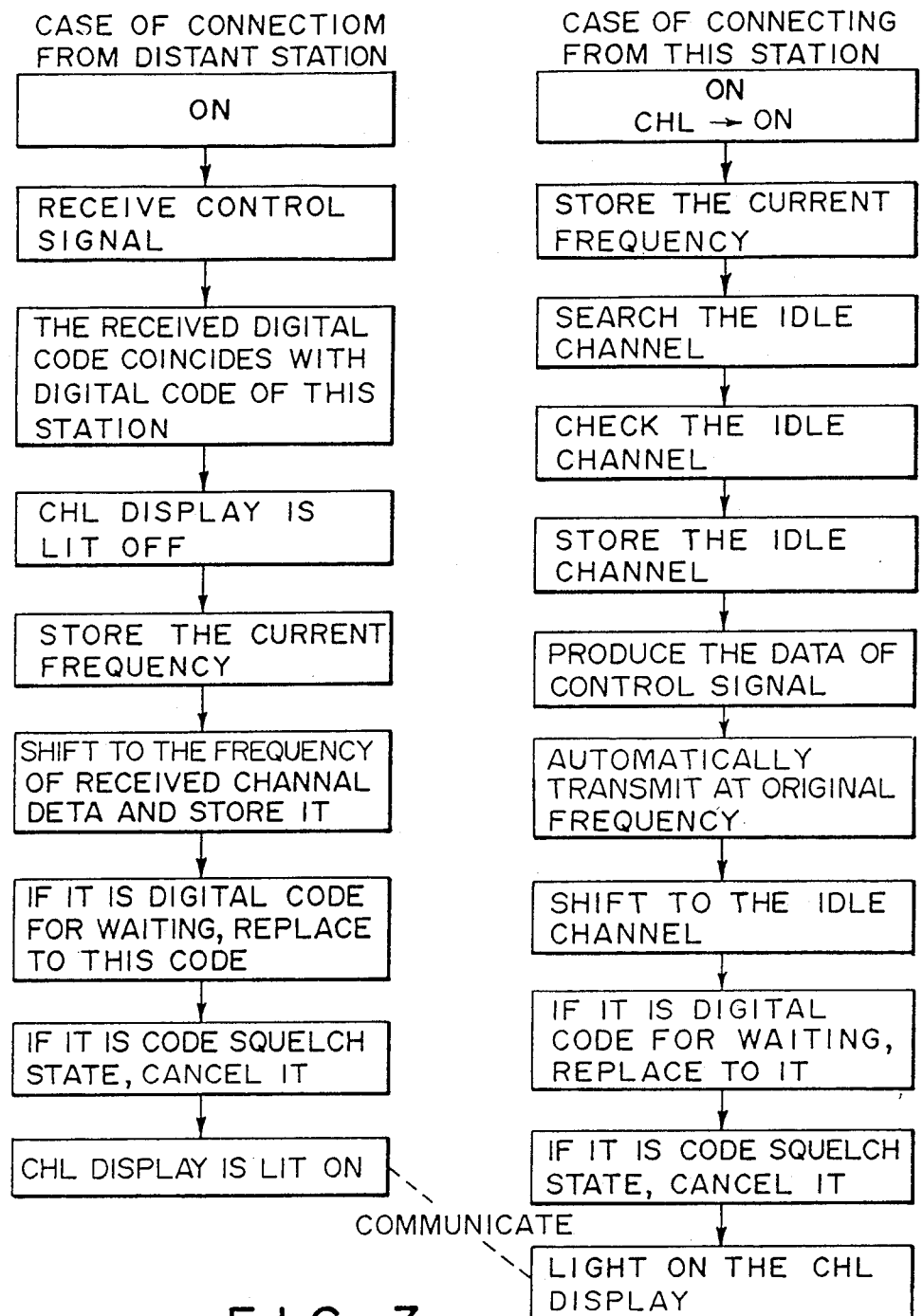
FIG. 3 is a diagram showing a procedure for the operation to connect the idle channel in the radio transceiver of the invention.

The connecting operation to the idle channel is performed in accordance with a procedure as shown in FIG. 3. In the originating call station, the idle channel is searched at random on a 20-kHz step basis in the usable band (the band of 144 MHz or 430 MHz) of the FM radio wave, but the calling frequency of the band and the frequency designated as the skip channel are eliminated. For discrimination of the idle channel, the channel is decided to be idle when the level of the received signal of that frequency channel is below a threshold value for a predetermined time or longer.

The automatic transmitting operation (for about 0.2 second) in the case of transmitting the control signal is executed by first checking the idle state by that frequency and then waiting until the station becomes idle if a radio wave is transmitted. In such a case, the apparatus is in the reception monitoring state. Therefore, the forced transmission due to the PTT can be performed in accordance with the situation. The search of the idle channel can be cancelled as well by pressing the PTT.

Figure 4:
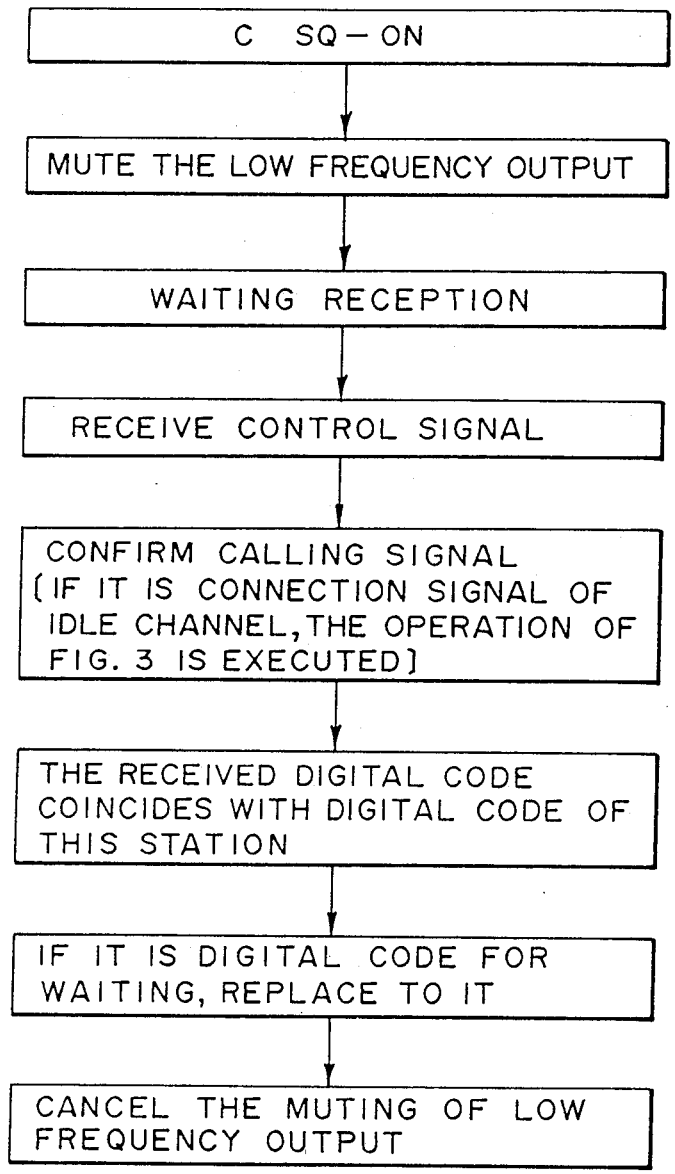
FIG. 4 is a diagram showing a procedure for the code squelch operation of the radio transceiver of the invention.
Figure 5A:
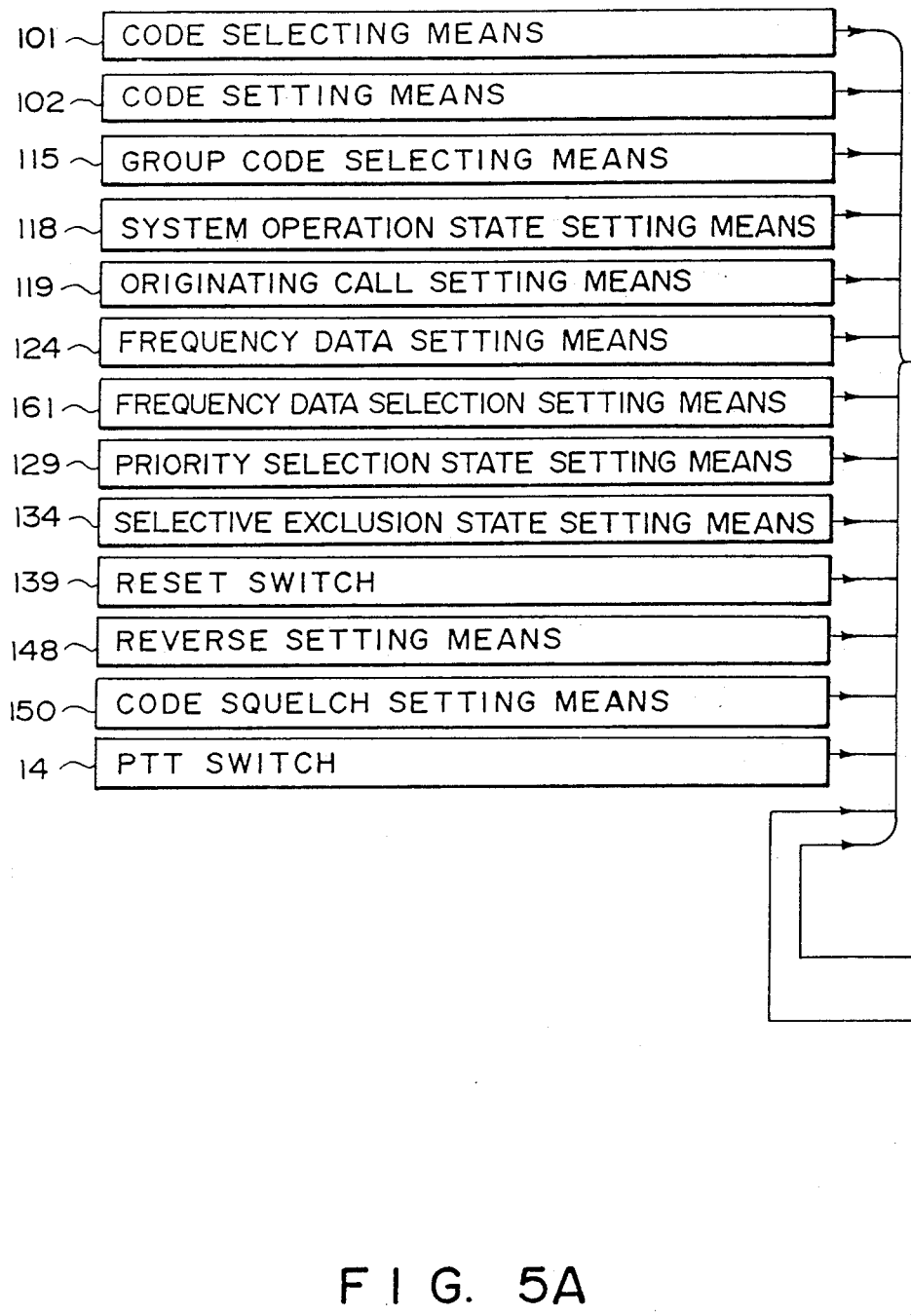
FIG. 5 is a circuit diagram showing an arrangement of an embodiment of the radio transceiver of the invention.
Figure 5B:
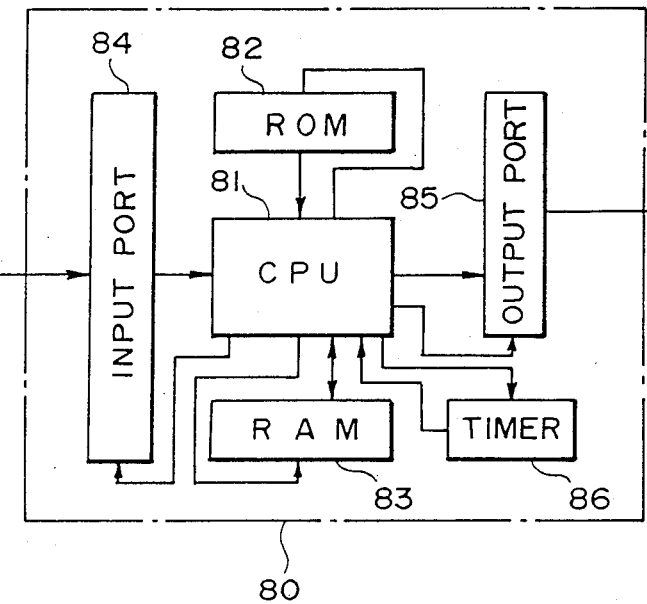
Figure 5:
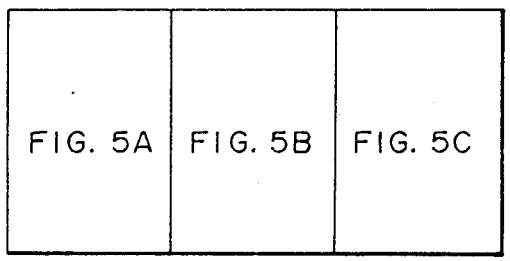

FIG. 4 shows an example of a procedure for the code squelch operation. No transmission is performed when the PTT (Push to Talk) switch is pressed in the code squelch state, but the code squelch operation is cancelled. This is because the monitor has a priority.

Figure 6A:
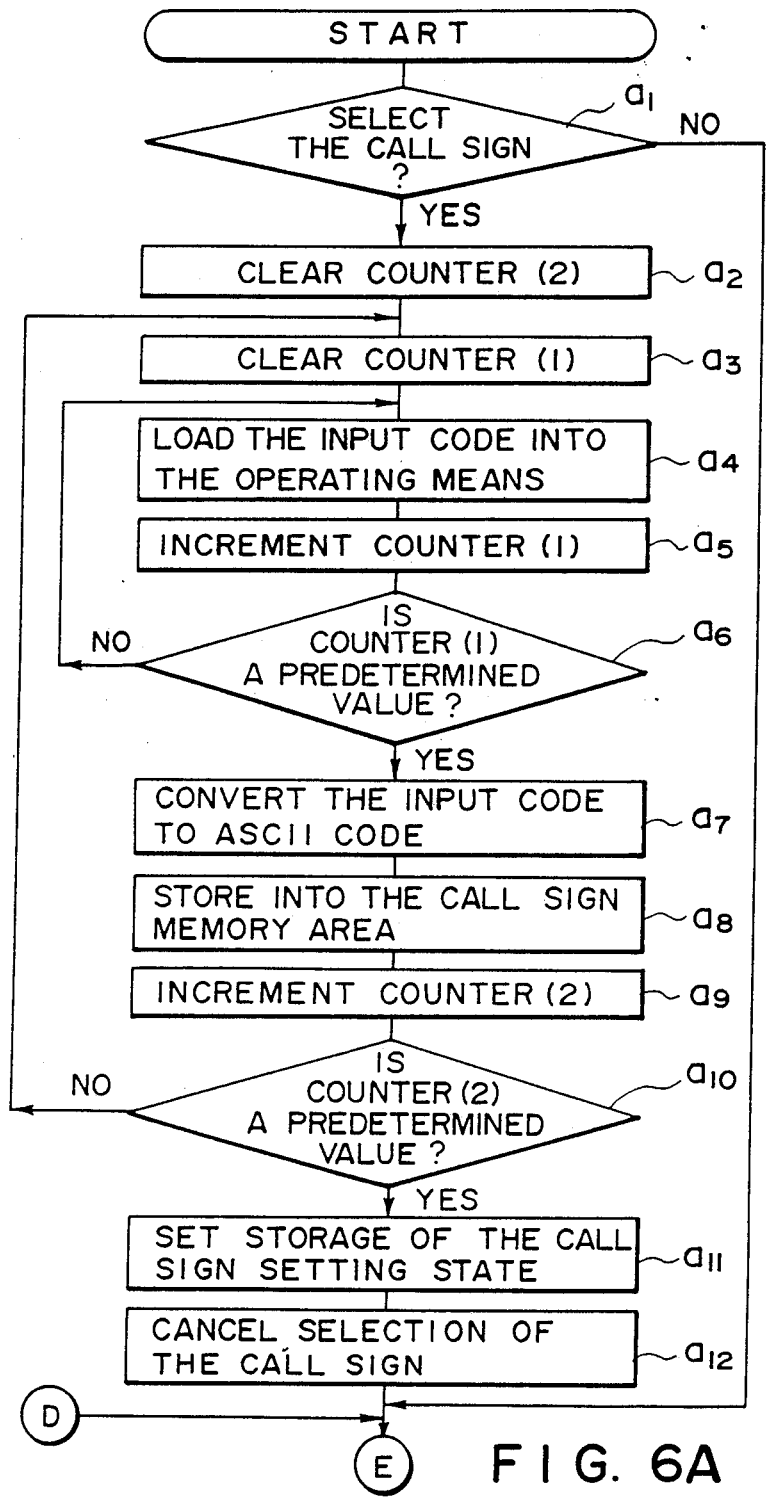
FIGS. 6 to 8 are flowcharts showing the operation of the embodiment of the radio transceiver shown in FIG. 5.
Figure 6B:
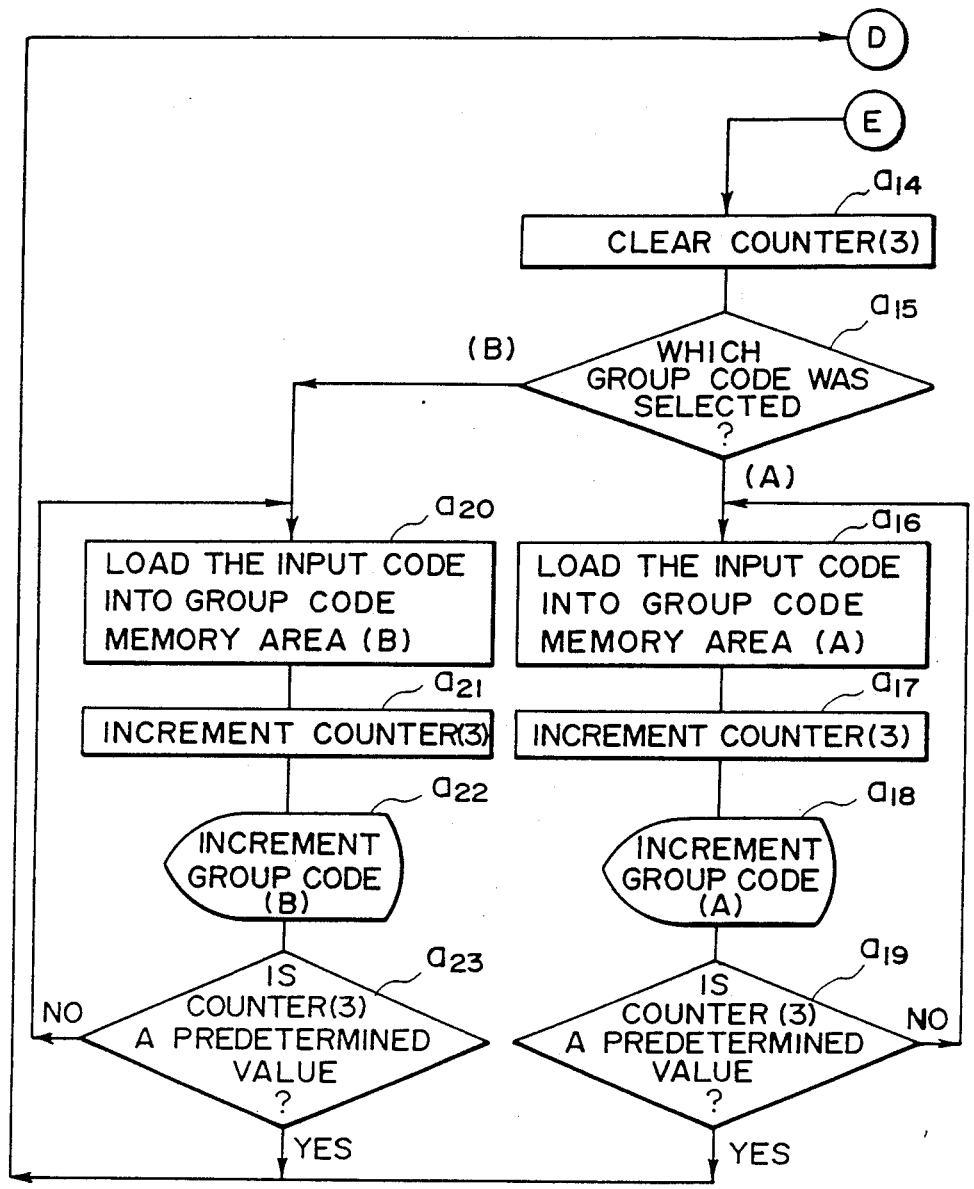
Figure 6C:
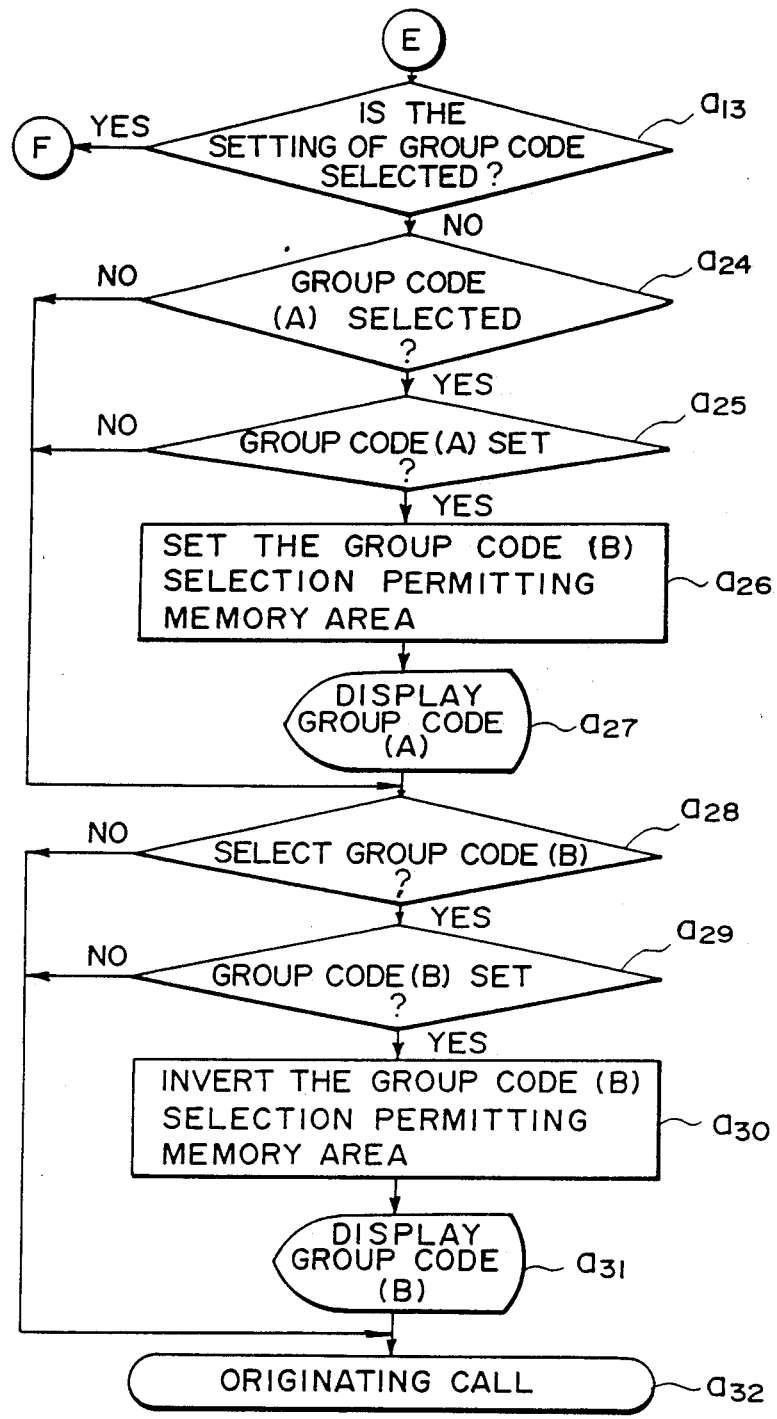

The operation of an embodiment of the present invention will be described hereinbelow with reference to flowcharts shown in FIGS. 6 to 8.

First, when the amateur radio transceiver of the present invention is made operative, it enters the receiving state unless otherwise a special operation is performed.

When the program is started, a check is made to see if the setting of the call sign code has been selected by code selecting means 101 or not (step $a_1$) The code selecting means 101 can designate the setting of the call sign code and set codes A and B. As will be explained hereinafter, when the setting of the call sign code is instructed, the code selecting means 101 can be controlled to the setting state of the set code A by a signal from a microcomputer 80. Although the set codes A and B are indicated as the set code so that they can also function as what are called group codes and also as the codes for code squelch, they are indicated as the group codes A and B hereinbelow.

The call sign code and the like are set by code setting means 102. Therefore, for example, one character of the ASCII code is instructed by pressing the code setting means 102 four times and it is assumed that the hexadecimal number corresponding to high order three bits of the ASCII code of seven units to which the value indicated by the code setting means 102 due to the depression of the first two times was added and the hexadecimal number corresponding to low order four bits of the ASCII code of seven units to which the value indicated by the code setting means 102 due to the depression of the next two times was added are shown, respectively.

In step $a_1$, when the setting of the call sign code is selected, a second count area (hereinafter, a count area is referred to as a counter) 104 provided in a RAM 83 is cleared (step $a_2$) to set the number of digits of the call sign. Then, a first counter 103 provided in the RAM 83 is cleared (step $a_3$) to count in order to allow the number of depression times of the code setting means 102 depressed to correspond to one character of the ASCII code. Then, a key switch output supplied from the code setting means 102 is loaded into call sign code operating means 106 (step $a_4$) to add the above-mentioned value due to the depression of two times in order to convert into the ASCII code. Then, the first counter is increased by "+1" (step $a_5$). Steps $a_4$ to $a_5$ are repeated by the number of times corresponding to one character of the ASCII code (step $a_6$). The input code is then converted into the ASCII code (step $a_7$). The converted ASCII code is stored into call sign code memory area 107 provided in the RAM 83 and the memory content is displayed in a call sign display device 114 through code operating means 113 (step $a_8$). Then, the second counter 104 is increased by "+1" (step $a_9$). Steps $a_3$ to $a_9$ are repeated by the number of times corresponding to the number of digits of the call sign (step $a_{10}$) When the count value of the second counter 104 becomes the value corresponding to the number of digits of the call sign in step $a_{10}$, the call sign code is completely stored into the call sign code memory area 107 and a flag is set into call sign code set state memory area 108 provided in the RAM 83 (step $a_{11}$). Then, the call sign code selection by the code selecting means 101 is cancelled and the position to set the group code A is selected (step $a_{12}$).

Subsequent to step $a_{12}$, a check is made to see if the setting of the group codes has been selected by the code selecting means 101 or not (step $a_{13}$).

In this embodiment, the case where two group codes of (A) and (B) can be set has been shown as an example; however, it is not limited to two group codes.

When the selection of the call sign code is not selected in step $a_1$, step $a_{13}$ is executed after step $a_1$.

When the setting of group codes is selected in step $a_{13}$, a third counter 105 which is provided in the RAM 83 and counts the number of digits of the group code is cleared (step $a_{14}$). A check is made to see if the selected group code is the group code (A) or not (step $a_{15}$). When it is detected in step $a_{15}$ that the group code (A) has been selected, the input code is loaded into a first group code memory area 109 provided in the RAM 83 (step $a_{16}$). The third counter 105 is increased by "+1" (step $a_{17}$). The set group code (A) is displayed in a data display device 112 through data display selecting means 111 (step $a_{18}$). After step $a_{18}$, steps $a_{16}$ to $a_{18}$ are repeated until the count value of the third counter 105 becomes the number of digits of the group code, and when the count value of the third counter 105 becomes the number of digits of the group code (step $a_{19}$), step $a_{13}$ is then executed. Thus, the set group code (A) is stored into the first group code memory area 109.

When the selected group code is not the group code (A) in step $a_{15}$, it is the group code (B). In this case, steps $a_{20}$ to $a_{23}$ are executed in a similar manner to steps $a_{16}$ to $a_{19}$ after step $a_{15}$. Thus, the set group code (B) is stored into second group code memory area 110 provided in the RAM 83.

When the setting of the group codes is not selected in step $a_{13}$, a check is made to see if the group code (A) has been selected by group code selecting means 115 or not in order to use the group code (A) for waiting (step $a_{24}$). When the group code (A) is selected by the group code selecting means 115, a check is made to see if the group code (A) has been stored into the first group code memory area 109 or not (step $a_{25}$).

When the group code (A) has been stored into the first group code memory area 109 in step $a_{25}$, a flag in a group code (A) selection permitting memory area 116 provided in the RAM 83 is inverted (step $a_{26}$). When the flag in the group code (A) selection permitting memory area 116 was set in step $a_{26}$, the set group code (A) is displayed in the data display device 112 together with the special indication such as, for example, a decimal point (step $a_{27}$). When the flag in the group code (A) selection permitting memory area 116 was reset in step $a_{26}$, the special indication such as, e.g., a decimal point is lit off and the set group code (A) is displayed in the data display device 112 (step $a_{27}$).

A check is then made to see if the group code (B) has been selected by the group code selecting means 115 or not in order to use the group code (B) for waiting (step $a_{28}$).

When the group code (A) is not selected in step $a_{24}$, and when the group code (A) is not set in step $a_{25}$, step $a_{28}$ is executed subsequent to steps $a_{24}$ and $a_{25}$.

When the group code (B) is selected in step $a_{28}$, a check is made to see if the group code (B) has been stored into the second group code memory area 110 or not (step $a_{29}$) in a manner similar to step $a_{25}$.

When the group code (B) has been stored in the second group code memory area 110 in step $a_{29}$, a flag in a group code (B) selection permitting memory area 117 provided in the RAM 83 is inverted (step $a_{30}$). When the flag in the group code (B) selection permitting memory area 117 was set in step $a_{30}$, the set group code (B) is displayed in the data display device 112 together with the special indication such as, e.g., a decimal point (step $a_{31}$). When the flag in the group code (B) selection permitting memory area 117 was reset in step $a_{30}$, the special indication such as, e.g., a decimal point is lit off and the set group code (B) is displayed in the data display device 112 (step $a_{31}$). In addition, it will be obvious from steps $a_{24}$ to $a_{30}$ that both of the group codes (A) and (B) can be selected.

The originating call routine is executed after step $a_{31}$. On the contrary, when the group code (B) is not selected in step $a_{28}$, and when the group code (B) is not set in step $a_{29}$, the originating call routine is executed subsequent to steps $a_{28}$ and $a_{29}$.

As will be apparent from the above description, the call sign code and the group codes (A) and (B) can be set. On the other hand, even when the group codes (A) and (B) were set and stored, if they are not selected in steps $a_{24}$ and $a_{28}$, they are not used for waiting or the like.

Figures 1A, 7:
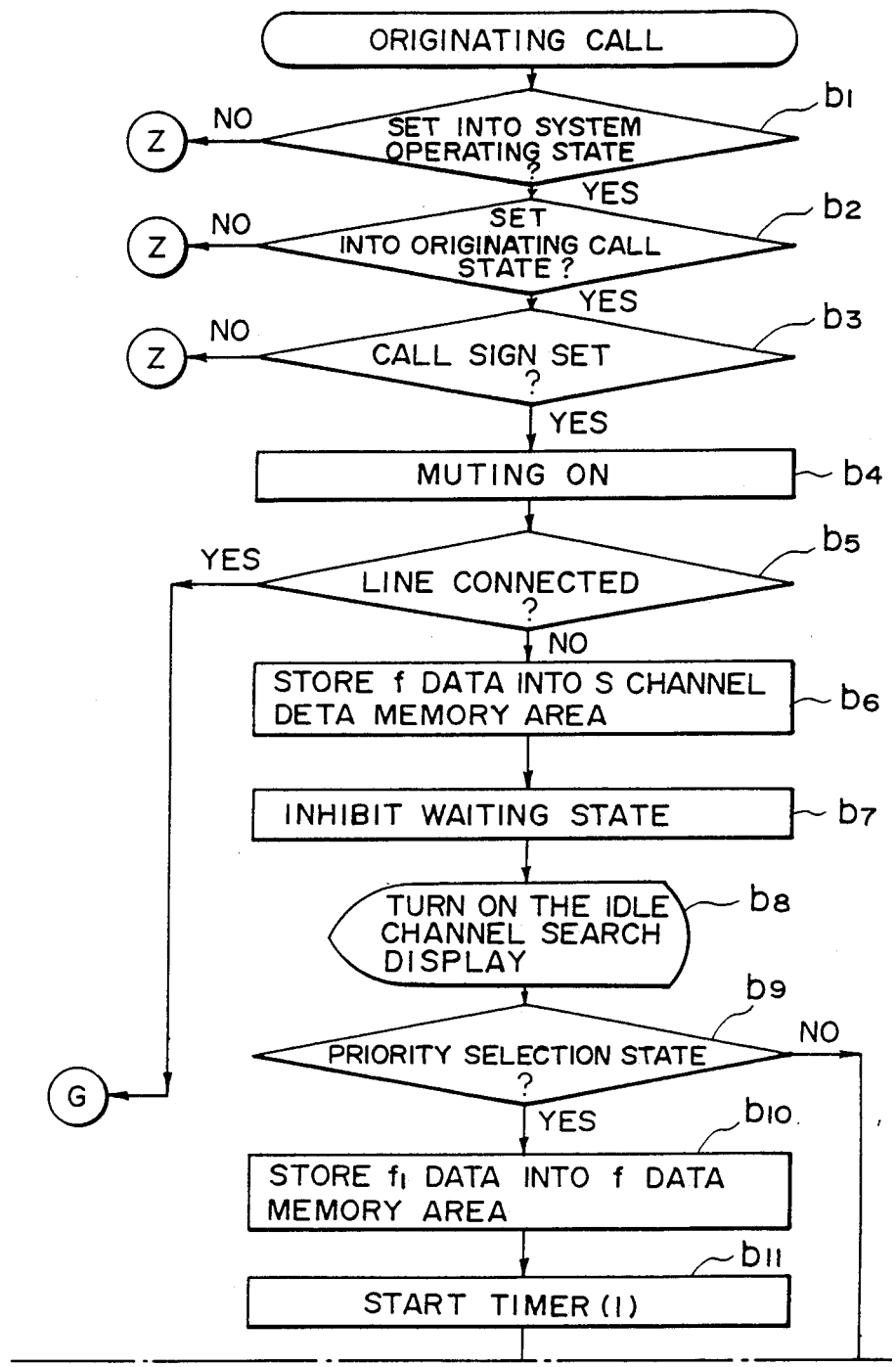
Figures 1B, 7:
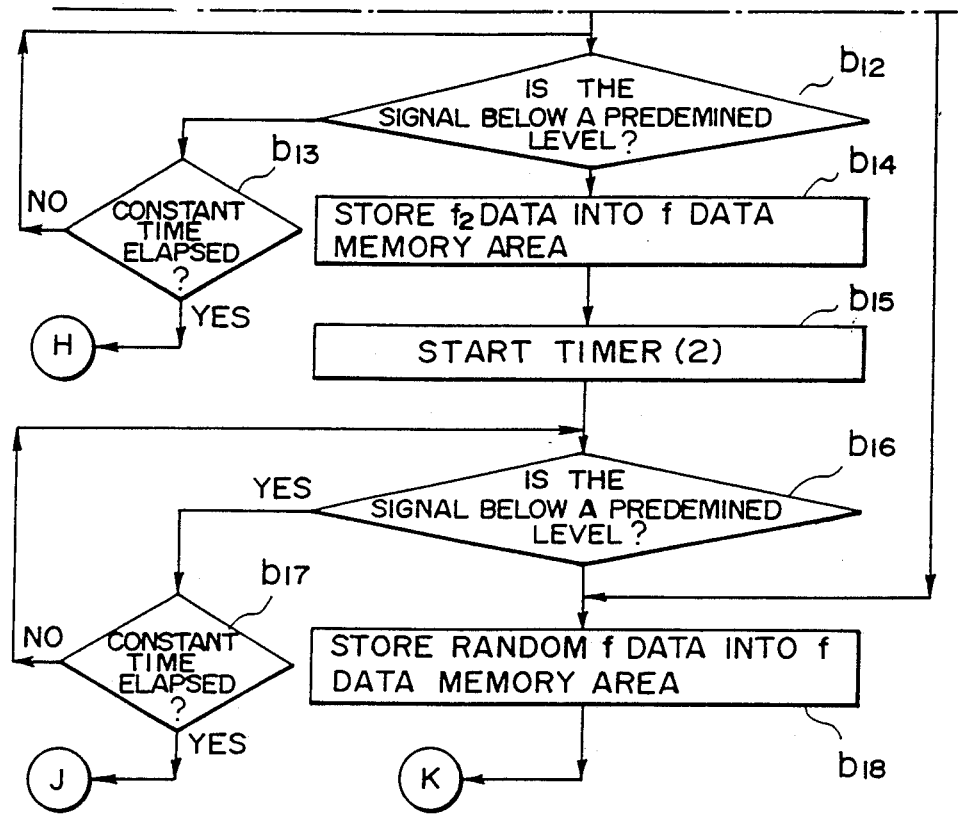
Figures 1, 7:
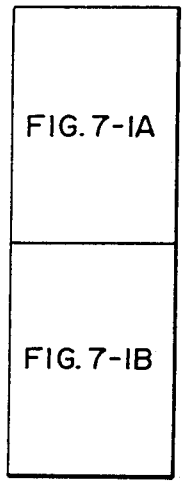
Figures 2B, 7:
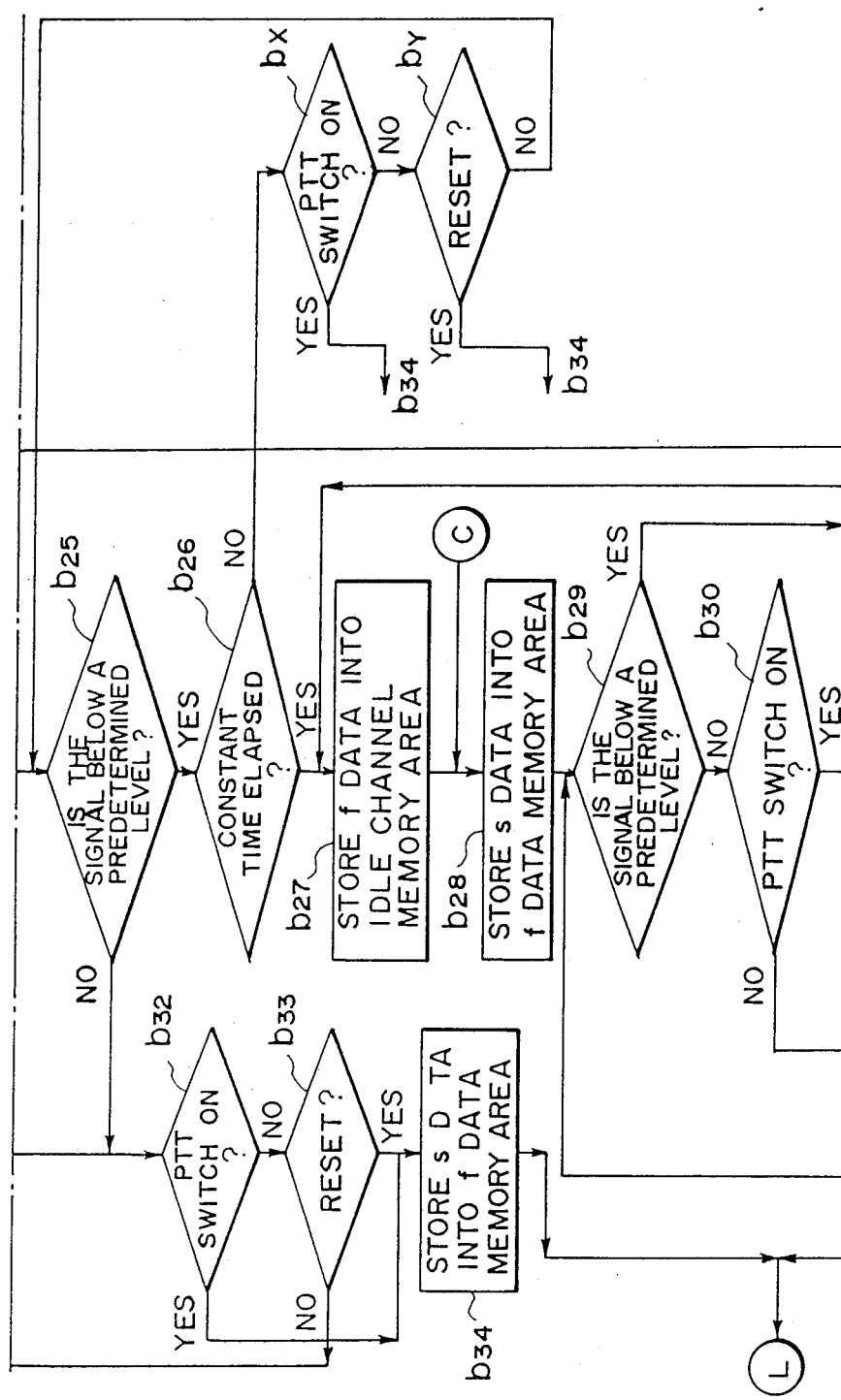
Figures 3, 7:
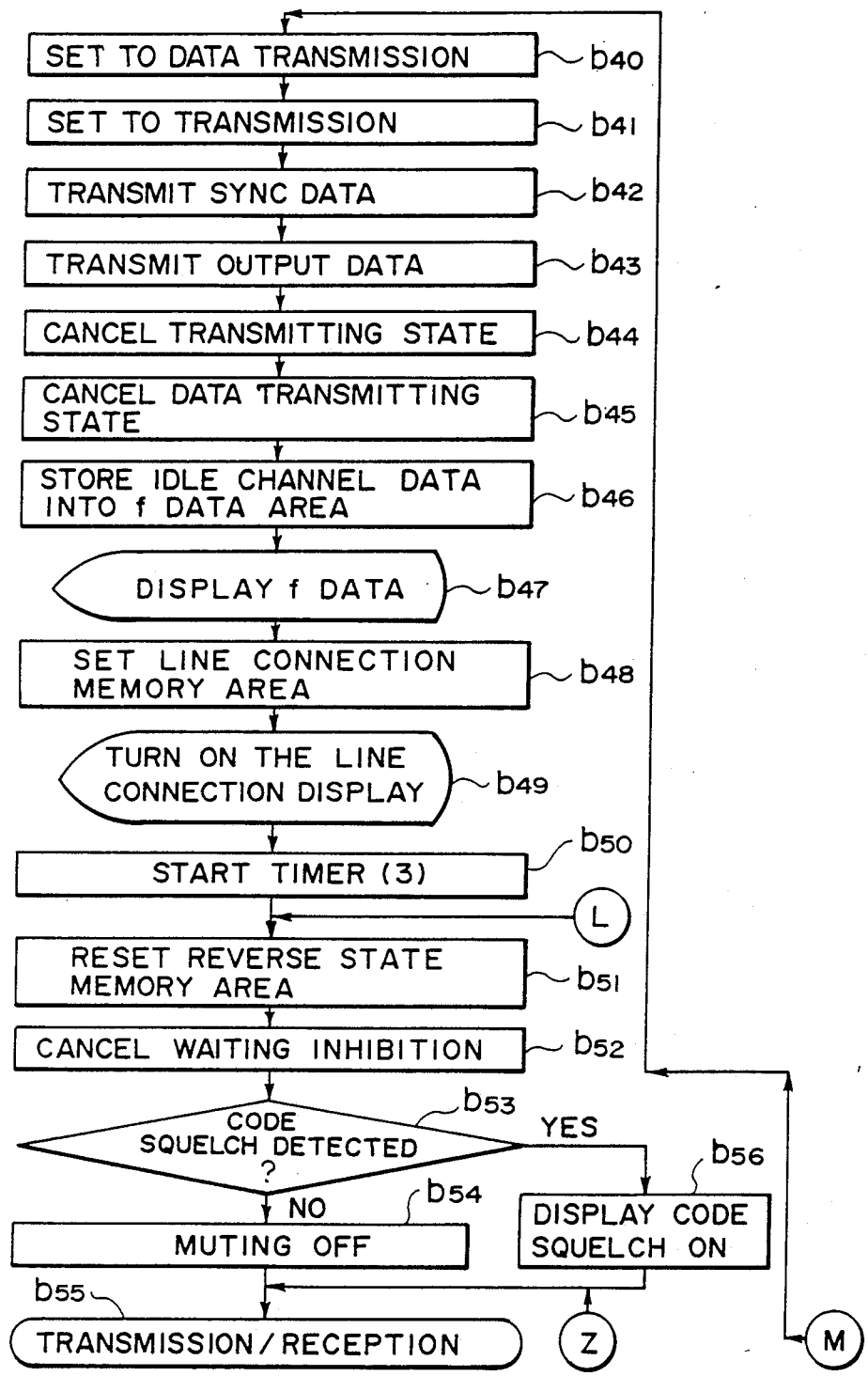
Figures 1A, 8:
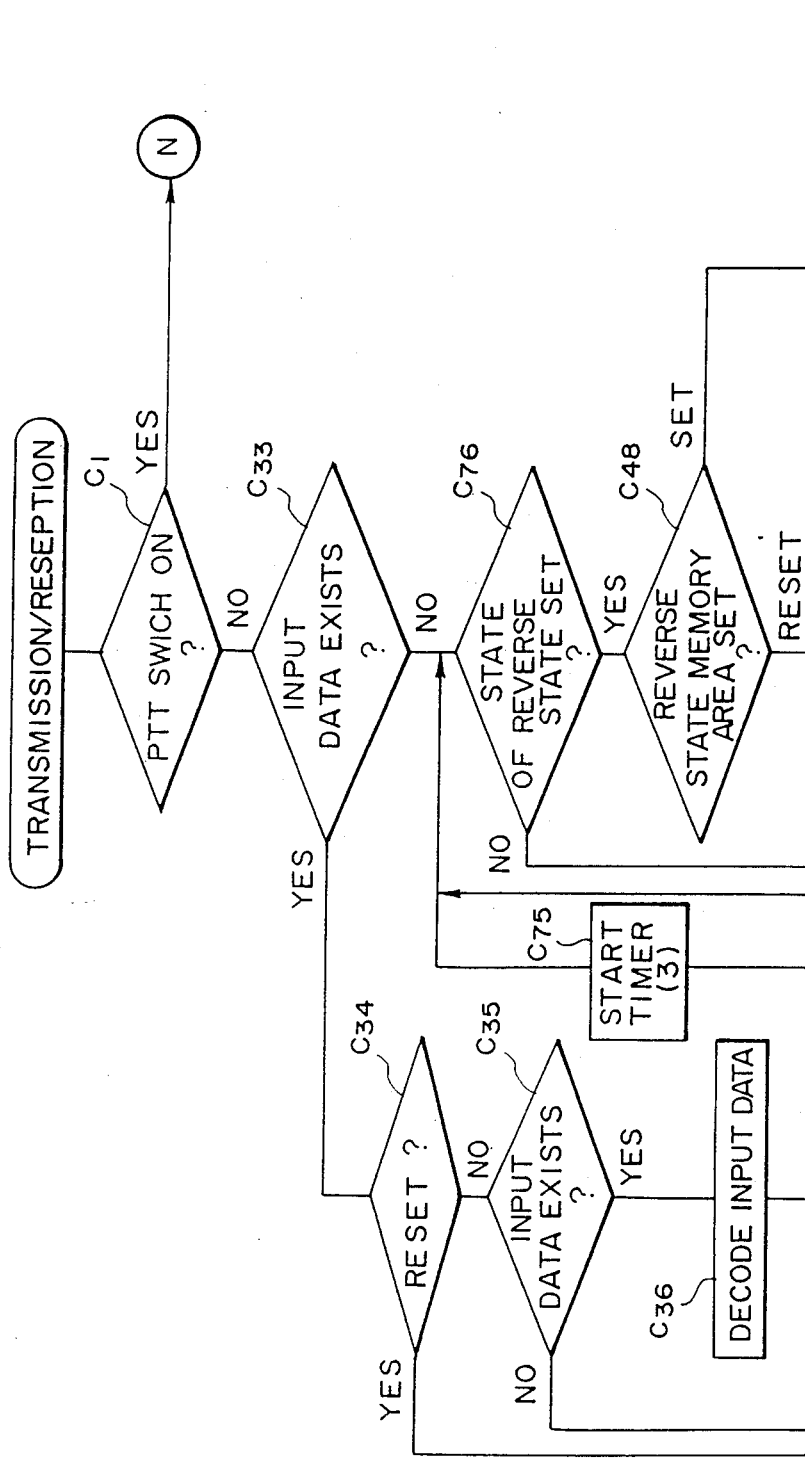
Figures 1B, 8:
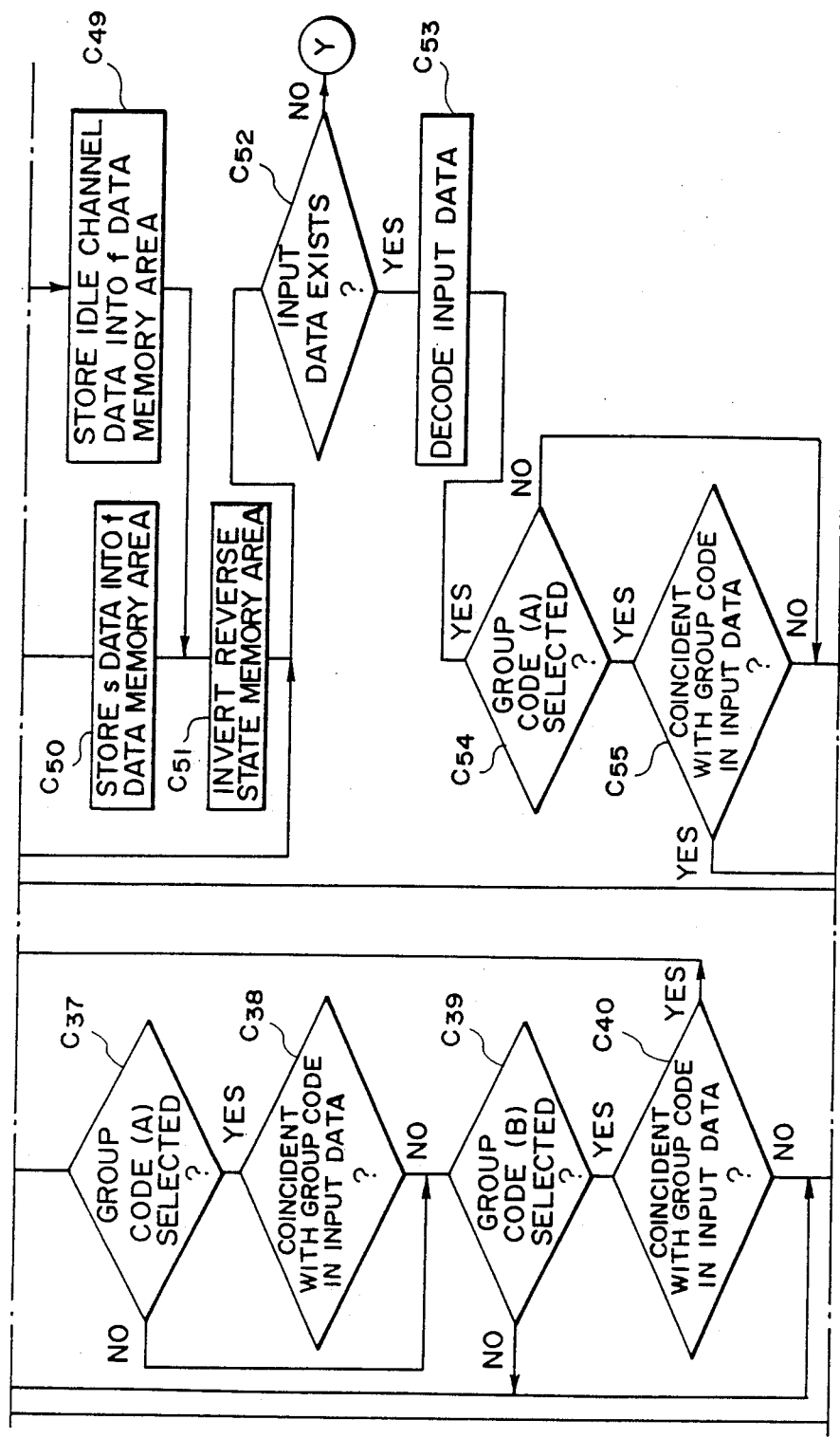
Figures 2, 8:
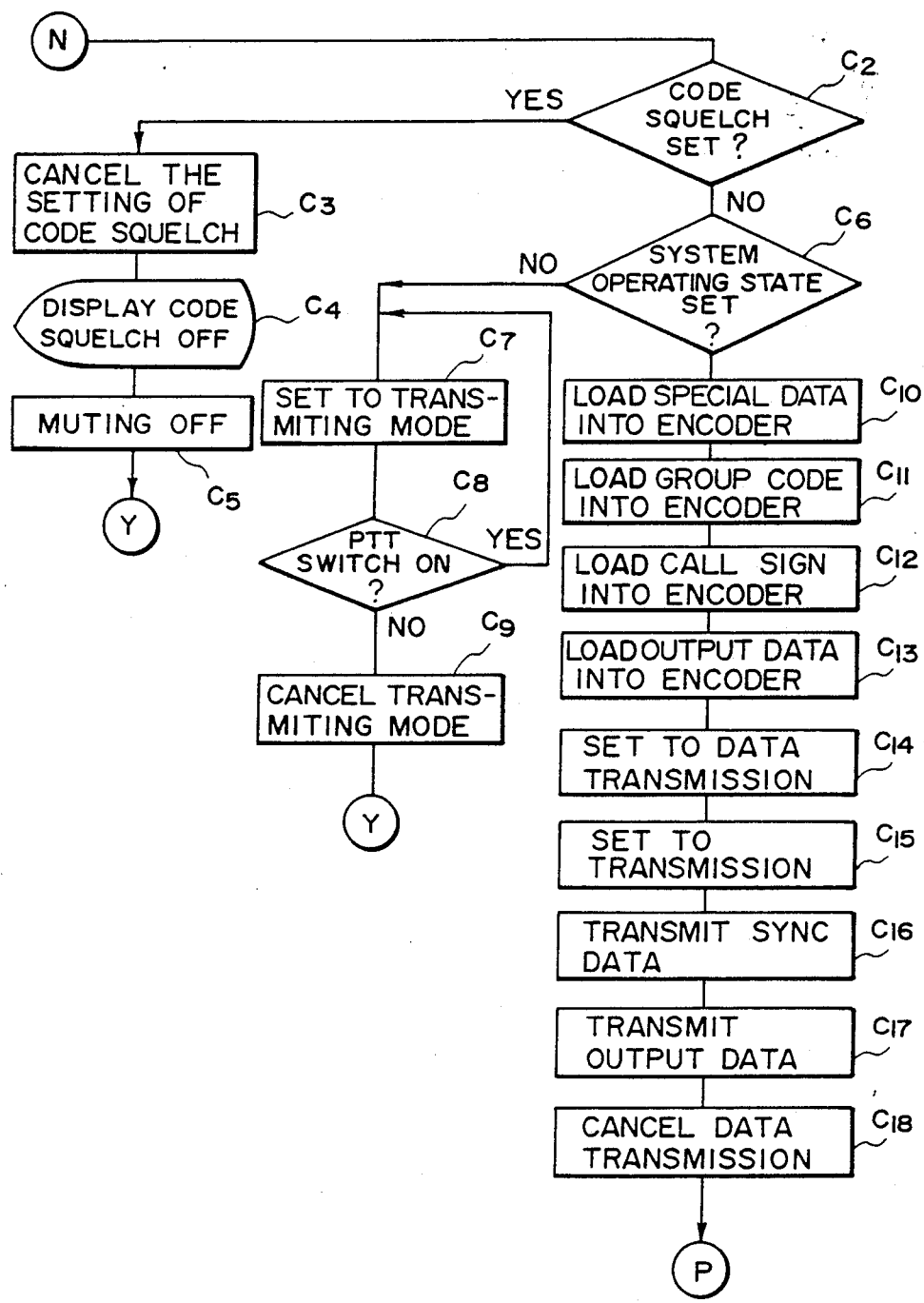
Figures 3, 8:
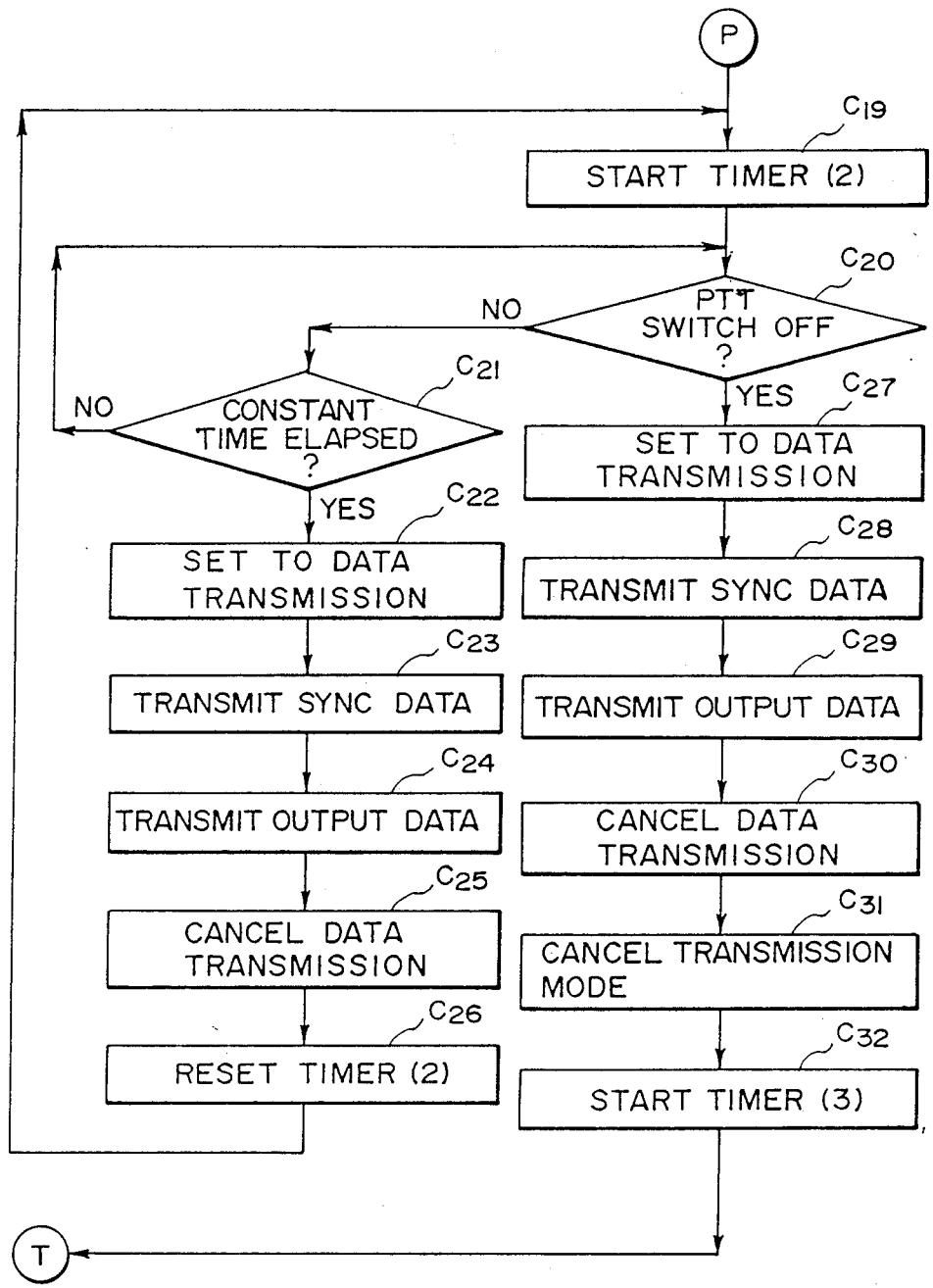
Figures 4A, 8:
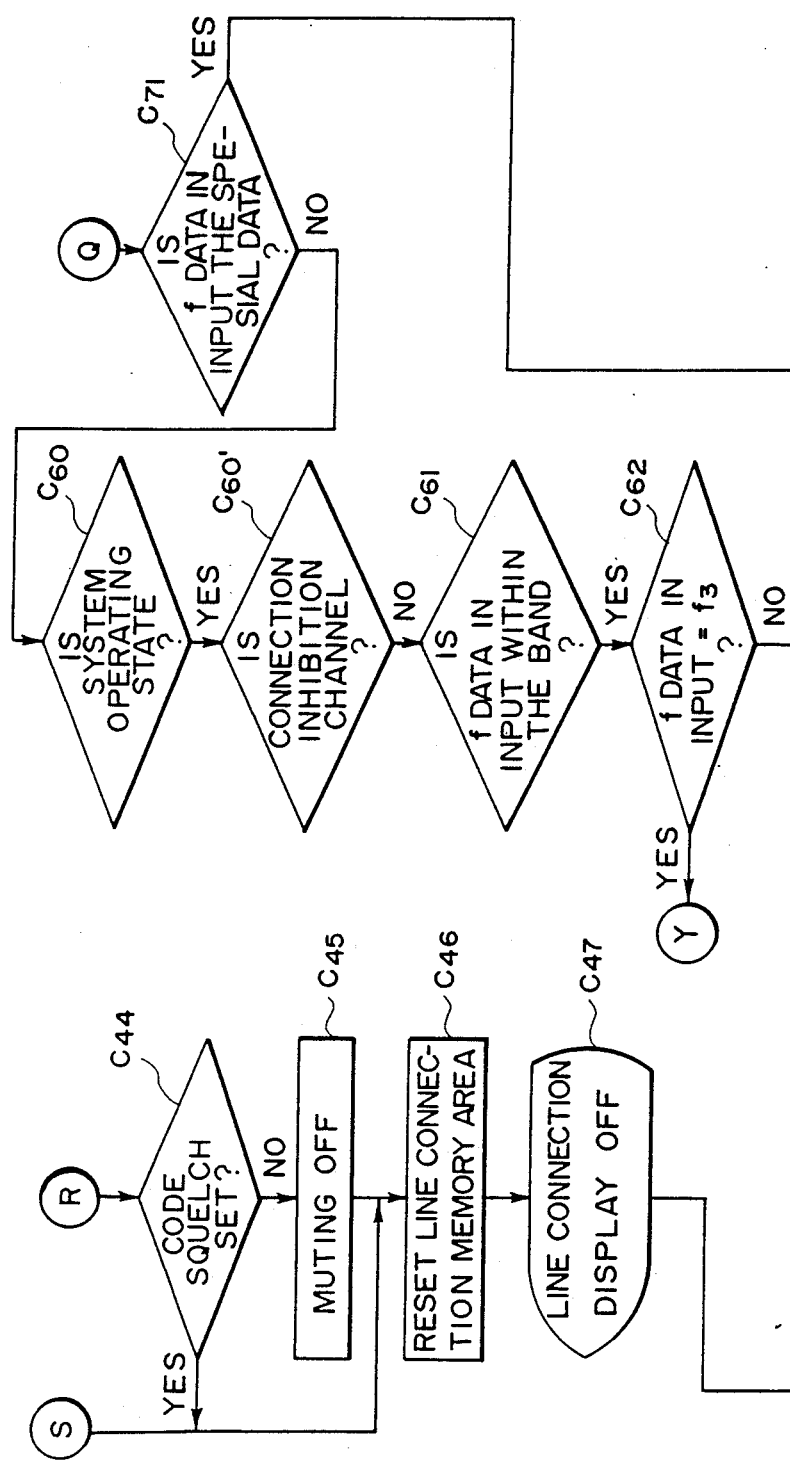
Figures 4B, 8:
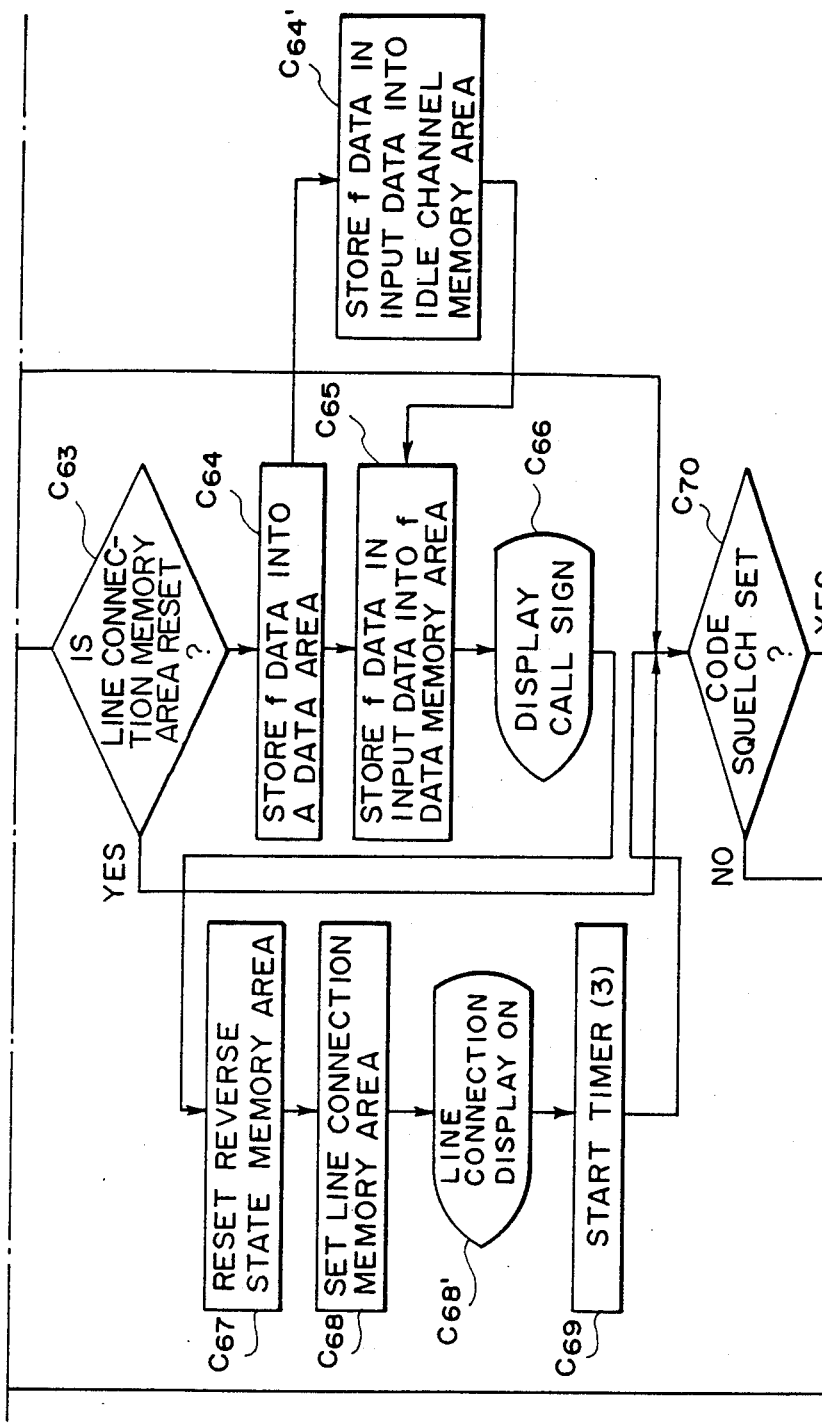

The originating call routine will then be described on the basis of FIG. 7.

In the originating call routine, a check is made to see if system operation state setting means 118 to designate whether the line of the transceiver is automatically connected to the distant transceiver or not has been set or not (step $b_1$). When the system operation state setting means 118 is not set in step $b_1$, the originating call routine is skipped and the transmission/reception routine, which will be explained hereinafter, is executed. When the system operation state setting means 118 has been set in step $b_1$, a check is made to see if originating call setting means 119 has been set or not (step $b_2$) after step $b_1$. When the originating call setting means 119 is not set in step $b_2$, the originating call routine is skipped and the transmission/reception routine is executed. When the originating call setting means 119 has been set in step $b_2$, a check is made to see if the call sign has been set or not (step $b_3$) after step $b_2$. The setting of the call sign is detected by checking whether a flag is set in the call sign code set state memory area 108 or not. When the call sign is not set in step $b_3$, the originating call routine is skipped and the transmission/reception routine is executed. Therefore, when the call sign is not set, the apparatus doesn't enter the originating call state and is not linked to the distant side. However, no problem occurs in the system even if the call sign is not set.

When the call sign is set in step $b_3$, muting means 120 is made operative, namely, it is set into the mute-on state (step $b_4$) after step $b_3$. Since the muting is performed in step $b_4$, when the idle line is being searched, the apparatus enters the receiving state, but the voice is muted. A check is then made to see if the line has been connected or not (step $b_5$) after step $b_3$. The connection of the line is detected by checking whether or not a flag was set into line connection memory area 121 provided in the RAM 83. When the line was connected in step $b_5$, the apparatus enters the reoriginating call state, which will be explained hereinafter. This state is caused by executing the originating call routine at least once.

When the line is not connected in step $b_5$, the frequency data stored in frequency data memory area 122 provided in the RAM 83 is loaded into a start channel data memory area (hereinafter, referred to as an S channel data memory area) 123 provided in the RAM 83 (step $b_6$). The frequency data determined between this side and the distant side to be communicated before step $b_6$ is set in the frequency data memory area 122 by frequency data setting means 124 consisting of a rotary encoder or the like. This set data is stored into the frequency data memory area 122.

Subsequent to step $b_6$, the waiting state is inhibited (step $b_7$). The waiting state is inhibited by resetting the flag in waiting state memory area 125 provided in the RAM 83. After step $b_7$, an idle channel search display device 126 is lit on, thereby indicating that the idle channel is being searched (step $b_8$). The idle channel may be indicated by a voice (e.g., a beep sound) as well as by the light.

On one hand, a check is made (step $b_9$) to see if priority selection state setting means 129 to preferentially select, as the communication channels, the frequency data, for example, $f_1$ and $f_2$ which were preliminarily individually set into an $f_1$ data memory area 127 and an $f_2$ data memory area 128 provided in the RAM 83 has been set or not. When the priority selection state has been set in step $b_9$, the frequency data $f_1$ is loaded into the frequency data memory area 122 (step $b_{10}$) and a first timer 130 starts timing (step $b_{11}$). An output frequency of a frequency synthesizer 5 is set by the frequency data stored in the frequency data memory area 122. Therefore, the receiving frequency (upon reception) and the transmitting frequency (upon transmission) are set. After step $b_{11}$, a check is made by idle channel detecting means 132 consisting of a comparator 39 to see if the received signal of the frequency corresponding to the $f_1$ frequency data loaded in the frequency data memory area 122 is below a predetermined level or not (step $b_{12}$). A check is made to see if the level of the received signal has been held at a level below the predetermined level for a set time of the first timer 130 or not (step $b_{13}$). When the received signal level in step $b_{12}$ has been held at a level below the predetermined level for the set time of the first timer 130 in step $b_{13}$, it is determined that the frequency corresponding to the $f_1$ frequency data is the idle line and step $b_{27}$, which will be explained hereinafter, is executed.

On the contrary, when the received signal level exceeds the predetermined level in step $b_{12}$, or when the state in that the received signal level is below the predetermined level doesn't continue for the set time of the first timer 130 in step $b_{13}$, the frequency data $f_2$ is loaded into the frequency data memory area 122 (step $b_{14}$) after step $b_{12}$. The first timer 130 starts timing (step $b_{15}$). After step $b_{15}$, a check is made to see if the received signal of the frequency corresponding to the $f_2$ frequency data loaded in the frequency data memory area 122 is below a predetermined level or not (step $b_{16}$). A check is then made to see if the received signal level has been held at a level below the predetermined level for the set time of the first timer 130 or not (step $b_{17}$). When the received signal level in step $b_{16}$ has been held at the level below the predetermined level for the set time of the first timer in step $b_{17}$, it is determined that the frequency corresponding to the $f_2$ frequency data is the idle line and step $b_{27}$, which will be explained hereinafter, is executed On the contrary, when the received signal level exceeds the predetermined level in step $b_{16}$, or when the state in that the received signal level is below the predetermined level does not continue for the set time of the first timer 130 in step $b_{17}$, the frequency data generated in random frequency generating means 133 is loaded into the frequency data memory area 122 (step $b_{18}$) after step $b_{16}$. Then, the frequency data stored in the frequency data memory area 122 is increased (step $b_{19}$).

When the priority selection state setting means 129 is not set in step $b_9$, step $b_{18}$ is executed after step $b_9$. In this case, the selection with respect to whether the frequency data is preferentially selected or not is not selected.

After step $b_{19}$, a check is made to see if selective exclusion state setting means 134 to exclude that the frequency data, for example, $f_3$ and $f_4$ which were preliminarily individually set into an $f_3$ data memory area (not shown) and an $f_4$ data memory area (not shown) provided in the RAM 83 are selected as the communication channels has been set or not (step $b_{20}$). When the selective exclusion state was set in step $b_{20}$, a check is made to see if the frequency data stored in the frequency data memory area 122 coincides with the frequency data $f_3$ or not by frequency data comparing means 138 (step $b_{21}$). When the frequency data stored in the frequency data memory area 122 is not the frequency data $f_3$ in step $b_{21}$, a check is then made to see if it coincides with the frequency data $f_4$ or not in a manner similar to the above (step $b_{22}$). When the frequency data stored in the frequency data memory area 122 is not the frequency data $f_4$ in step $b_{22}$, a check is made to see if the frequency corresponding to the frequency data stored in the frequency data memory area 122 is the frequency in the amateur band stored in a frequency data memory area 135 within a set range provided in the RAM 83 or not (step $b_{23}$) subsequent to step $b_{22}$. When step $b_{23}$ is executed through steps $b_{21}$ and $b_{22}$, the frequency data stored in the frequency data memory area 122 doesn't correspond to the frequency to be selectively excluded in step $b_{19}$.

When the selective exclusion state setting means 134 is not set in step $b_{20}$, step $b_{23}$ is executed subsequent to step $b_{20}$. In this case, the discrimination regarding the frequency data to be selectively excluded is not carried out.

When the frequency corresponding to the frequency data stored in the frequency data memory area 122 is the frequency in the amateur band in step $b_{23}$, the first timer 130 starts timing (step $b_{24}$). A check is then made to see if the received signal level is below a predetermined level or not (step $b_{25}$). A check is made to see if the received signal level has been held at a level below the predetermined level for the set time of the first timer 130 or not (step $b_{26}$).

When the state in that the received signal level is below the predetermined level doesn't continue for the set time of the first timer 130 in step $b_{26}$, a check is made to see if a PTT switch 14 has been turned on or not (step $b_x$). When the PTT switch 14 is not ON, a check is made to see if a reset switch 139 has been turned on or not (step $b_y$). When the PTT switch 14 is ON in step $b_x$, and when the reset switch 139 is ON in step $b_y$, this means that the stop of the originating call is instructed. In this case, the frequency data stored in the S channel data memory area 123 is loaded in the frequency data memory area 122 (step $b_{34}$) after steps $b_x$ and $b_y$. Then, step $b_{51}$, which will be explained hereinafter, is executed.

When the reset switch 139 is not ON in step $b_y$, a check is again made to see if the received signal level is below the predetermined level or not (step $b_{25}$).

When the received signal has been held at the level below the predetermined level for the set time of the first timer 130 in step $b_{26}$, the frequency corresponding to the frequency data stored in the frequency data memory area 122 is the idle line in step $b_{19}$. On one hand, after step $b_{26}$, the frequency data stored in the frequency data memory area 122 is loaded in an idle channel data memory area 136 provided in the RAM 83 (step $b_{27}$). The frequency data stored in the S channel data memory area 123 is loaded in the frequency data memory area 122 (step $b_{28}$) after step $b_{27}$.

When step $b_{28}$ is executed through step $b_{13}$ or step $b_{17}$, the frequency data $f_1$ or $f_2$ is stored in the idle channel data memory area 136. When step $b_{28}$ is executed through steps $b_{20}$ to $b_{27}$, the frequency data which is stored in the idle channel data memory area 136 is not the frequency data $f_3$ and $f_4$. When step $b_{28}$ is executed through step $b_5$, on one hand, the frequency data stored in the S channel data memory area 123 is again loaded into the frequency data memory area 122 in step $b_{28}$ in the state in that the line was connected. This means the reoriginating call.

Subsequent to step $b_{28}$, a check is made to see if the received signal level of the frequency corresponding to the frequency data loaded in the frequency data memory area 122 is below a predetermined level or not (step $b_{29}$). When it exceeds the predetermined level, a check is made to see if the PTT switch 14 has been turned on or not (step $b_{30}$). When the PTT switch 14 is ON in step $b_{30}$, and when the received signal level is below the predetermined level in step $b_{29}$, it is determined that the search of the idle line has been finished, and the idle channel search display device 126 is lit off (step $b_{31}$). When step $b_{31}$ is executed through step $b_{30}$, the received signal level is over the predetermined value; however, the originating call is forcedly performed. The detection in step $b_{29}$ to see if the received signal level is below the predetermined level or not is performed in order to confirm whether the start channel is the idle line or not at this time.

When the frequency data stored in the frequency data memory area 122 coincides with the frequency data $f_3$ or with the frequency data $f_4$ or when it corresponds to the frequency out of the amateur band in steps $b_{21}$, $b_{22}$, and $b_{23}$, or when the received signal level exceeds the predetermined level in step $b_{25}$, a check is made to see if the PTT switch 14 is ON or not (step $b_{32}$) subsequent to steps $b_{21}$, $b_{22}$, $b_{23}$, and $b_{25}$. When the PTT switch 14 is not ON, a check is made to see if the reset switch 139 has been turned on or not (step $b_{33}$). When the reset switch 139 is OFF in step $b_{33}$, step $b_{19}$ is executed after step $b_{33}$.

When the PTT switch 14 in ON in step $b_{32}$, and when the reset switch 139 is ON in step $b_{33}$, the stop of the originating call is instructed. The frequency data stored in the S channel data memory area 123 is loaded into the frequency data memory area 122 (step $b_{34}$) after steps $b_{32}$ and $b_{33}$ and step $b_{51}$, which will be explained hereinafter, is executed. When the PTT switch 14 is not ON in step $b_{30}$, a check is made to see if the reset switch 139 has been turned on or not (step $b_{35}$) after step $b_{30}$. When the reset switch 139 is not ON, step $b_{29}$ is executed after step $b_{35}$. When the reset switch 139 is ON in step $b_{35}$, the stop of the originating call is instructed and step $b_{51}$, which will be explained hereinafter, is executed after step $b_{35}$.

After step $b_{31}$, the frequency data stored in the idle channel data memory area 136 is loaded into output data encoding means 141 (step $b_{36}$). Then, the group code (A) selected by the code selecting means 101 is loaded into the output data encoding means 141 (step $b_{37}$). Further, the call sign data stored in the call sign code memory area 107 is loaded into the output data encoding means 141 (step $b_{38}$). Next, the data loaded in the output data encoding means 141 is encoded into, for example, the Hargelbarger code (step $b_{39}$). Therefore, the call sign code, group code, and idle channel frequency data are encoded in step $b_{37}$.

After step $b_{39}$, the transmitting section 2 is set into the data transmission mode, namely, the output which is derived by converting an output of the output encoding means 141 by a parallel/serial converting means 40 is supplied to the transmitting section (step $b_{60}$). In the transceiver, transmission/reception switching means 6 is set into the transmission mode (step $b_{41}$) and the sync data generated from a sync data generator 144 is then transmitted (step $b_{42}$). After step $b_{42}$, the output data encoded in step $b_{39}$ is then transmitted (step $b_{43}$). Therefore, by executing step $b_{43}$, what is called an originating call in which the frequency corresponding to the S channel frequency data is modulated by the data including the idle channel frequency data and is transmitted is carried out.

After step $b_{43}$, the transmission mode is cancelled and the transmission/reception switching means 6 is reset to the reception mode (step $b_{44}$). Further, the data transmission mode is cancelled (step $b_{45}$) and the frequency data stored in the idle channel data memory area 136 is loaded into the frequency data memory area 122 (step $b_{46}$). Thus, the transceiver is set to the idle channel receiving frequency searched and is set to the waiting state of the transmission from the distant side. After step $b_{46}$, the frequency corresponding to the frequency data stored in the idle channel data memory area 136 is displayed in the data display device 112 (step $b_{47}$). After step $b_{47}$, a flag is set into the line connection memory data 121 (step $b_{48}$). In step $b_{48}$, the line is forcedly connected to the reception side on the transmission side. After step $b_{48}$, a line connection display device 146 is lit on (step $b_{49}$). After side $b_{49}$, a third timer 147 starts timing (step $b_{50}$) The set time of the third timer 147 is set to the time assuming that the line is not connected when nothing is inputted from the distant side within this set time.

After step $b_{50}$, a flag in a reverse state memory area 149 provided in the RAM 83 is reset in order to store the output state of reverse state setting means 148 (step $b_{51}$). The reverse state memory area 149 represents whether the frequency data stored in the frequency data memory area 122 is the frequency data corresponding to the idle channel or the frequency data corresponding to the S channel.

After step $b_{51}$, the flag in the waiting state memory area 125 is set and the inhibition of the waiting state is cancelled (step $b_{52}$). Then, a check is made to see if the code squelch has been set by code squelch setting means 150 or not (step $b_{53}$). When no code squelch is set in step $b_{53}$, the muting by the muting means 120 is cancelled (step $b_{54}$) after step $b_{53}$ and the transmission/reception routine is executed. In this state, the frequency corresponding to the idle channel frequency data can be received. When the code squelch has been set in step $b_{53}$, a code squelch display device 151 is lit on (step $b_{56}$) after step $b_{53}$ and then the transmission/reception routine is executed. Since the muted state is maintained in this state, the reception cannot be performed.

On the other hand, when step $b_{51}$ is executed after steps $b_{34}$ and $b_{35}$, this means that steps $b_{26}$ to $b_{50}$ and steps $b_{31}$ to $b_{50}$ were skipped and indicates the case where the search of the idle channel was forcedly cancelled and the originating call was forcedly stopped.

The transmission/reception routine will then be described with reference to FIG. 8.

When the transmission/reception routine is started, a check is made to see if the PTT switch 14 has been turned on or not (step $c_1$). When the PTT switch 14 is ON in step $c_1$, a check is made to see if the code squelch has been set or not (step $c_2$). When the code squelch has been set in step $c_2$, the setting of the code squelch is cancelled (step $c_3$). The code squelch display device 151 is then lit off (step $c_4$). The muting by the muting means 120 is cancelled (step $c_5$). Thereafter, the transmission/reception routine is finished and the processing routine is returned to "START".

When steps $c_1$ to $c_5$ are executed, the reception can be performed by turning off the PTT switch 14.

When the code squelch isn't set in step $c_2$. a check is made to see if the system operation state setting means 118 has been set or not (step $c_6$) in a manner similar to step $b_1$ after step $c_2$. When the system operation state setting means 118 is not set in step $c_6$, the apparatus is set into the transmitting mode (step $c_7$). A check is then made to see if the PTT switch 14 has been turned on or not (step $c_8$). When the PTT switch 14 is ON in step $c_8$, step $c_7$ is executed. Therefore, when the PTT switch 14 is ON in step $c_8$, the transmission is continued until the PTT switch 14 is turned off in step $c_8$. In this case, the transmission in the case by the conventional amateur radio transceiver is carried out instead of the transmission under the system operating state. When the PTT switch 14 is OFF in step $c_8$, the transmitting mode is cancelled (step $c_9$) and the transmission/reception routine is ended and the processing routine is returned to "START".

When the system operation state setting means 118 has been set in step $c_6$, after step $c_6$, the special frequency data which was preset into a special frequency data memory area 152 provided in the RAM 83 and corresponds to the frequency out of the amateur band is loaded into the output data encoding means 141 in place of the frequency data stored into the idle channel data memory area 136 (step $c_{10}$). Next, the group code (A) is loaded into the output data encoding means 141 (step $c_{11}$). Further, the call sign data stored in the call sign code memory area 107 is loaded into the output data encoding means 141 (step $c_{12}$) and is encoded by the output data encoding means 141 (step $c_{13}$).

After step $c_{13}$, the transmitting section 2 is set into the data transmitting mode (step $c_{14}$) and the transceiver is set into the transmitting mode (step $c_{15}$). The sync data is transmitted (step $c_{16}$) and the output data encoded in step $c_{13}$ is then transmitted (step $c_{17}$). The data transmitting mode is cancelled due to the end of transmission (step $c_{18}$). The frequency data which was preset into the special frequency data memory area 152 is encoded in place of the idle channel data and transmitted at the frequency corresponding to the frequency data stored in the frequency data memory area due to steps $c_{10}$ to $c_{17}$. On the distant side which received this transmission, the code squelch is cancelled as will be explained hereinafter.

The transmission can be performed due to the completion of the execution of step $c_{18}$. After step $c_{18}$, a second timer 153 starts timing (step $c_{19}$). After step $c_{19}$, a check is made to see if the PTT switch 14 is OFF or not (step $c_{20}$). When the PTT switch 14 is not OFF, the apparatus waits until a set time of the second timer 153 elapses (step $c_{21}$). When the set time of the second timer 153 has elapsed in step $c_{21}$, the apparatus is set into the data transmitting mode in a manner similar to step $c_{14}$ (step $c_{22}$). The sync data is transmitted (step $c_{23}$). The output data which is derived by encoding the frequency data, as the idle channel data, stored in the special channel data memory area 152 in step $b_{36}$ is transmitted (step $c_{24}$). The data transmitting mode is cancelled (step $c_{25}$). The third timer 147 starts timing (step $c_{26}$). Then, step $c_{19}$ is again executed. Therefore, due to steps $c_{19}$ to $c_{26}$, each time the set time period of the second timer 153 elapses, the transmission is temporarily interrupted and the transmission of the output data is repeated. While the transmission is being performed, the third timer 147 is reset due to step $c_{26}$ and the timing operation of the third timer 147 is newly repeated.

When the PTT switch 14 is OFF in step $c_{20}$, this means that there is no will of communication and in this state, the output data is transmitted (steps $c_{27}$ to $c_{30}$) after step $c_{20}$ in a manner similar to steps $c_{22}$ to $c_{25}$. Then, the transmitting mode is cancelled (step $c_{31}$). The third timer 147 starts timing (step $c_{32}$). Thereafter, the transmission/reception routine is ended and the processing routine is returned to "START". Steps $c_2$ to $c_{32}$ correspond to the transmission routine.

When the PTT switch 14 is OFF in step cl, a check is made to see if the flag has been set into the line connection memory area 121 or not after step $c_1$ (step $c_{33}$). When the flag has been set in step $c_{33}$, namely, when the line has been connected, a check is made to see if the reset switch 139 has been turned on or not (step $c_{34}$) after step $c_{33}$. When the reset switch 139 is OFF, namely, when it is not reset in step $c_{34}$, a check is made to see if the input data exists or not (step $c_{35}$) after step $c_{34}$. As described above, in this embodiment, the apparatus is ordinarily in the receiving mode. When the output data from the distant side has been received in step $c_{35}$, the input data is converted to the parallel data by a serial/parallel converting means 42 and decoded by input data decoding means 155 (step $c_{36}$) after step $c_{35}$. A check is then made to see if the group code (A) has been selected or not (step $c_{37}$). When the group code (A) has been selected, a check is made to see if the group code in the input data coincides with the group code (A) or not by code comparing means 156 (step $c_{38}$). When the group code (A) is not selected in step $c_{37}$, or when the group code in the input data doesn't coincide with the group code (A) in step $c_{38}$, a check is made to see if the group code (B) has been selected or not (step $c_{39}$) after steps $c_{37}$ and $c_{38}$. When the group code (B) has been selected, a check is made to see if the group code in the input code coincides with the group code (B) or not (step $c_{40}$). When the group code (B) is not selected in step $c_{39}$, or when the group code in the input data doesn't coincide with the group code (B) in step $c_{40}$, a check is made to see if the set time of the third timer 147 has elapsed or not (step $c_{41}$) after steps $c_{39}$ and $c_{40}$. When no input data exists in step $c_{35}$, step $c_{41}$ is executed after step $c_{35}$. As is obvious in steps $c_{37}$ to $c_{40}$, the waiting is performed by the group codes (A) and (B).

Therefore, when the reset is not instructed and no input data exists, and when the group code in the input data doesn't coincide with the group code in the selected state even if the input data exists, the muting by the muting means 120 is executed (step $c_{42}$) after an expiration of the set time of the third timer 147. After step $c_{42}$, the frequency data stored in the S channel data memory area 123 is loaded into the frequency data memory area 122 and the transceiver is set from the receiving mode of the idle channel frequency to the receiving mode of the frequency corresponding to the data (S channel data which was determined between this side and the distant side in step $b_6$) stored in the S channel data memory area 123 (step $c_{43}$). The flag in the reverse state memory area 148 is set (step $c_{43}'$). A check is then made to see if the code squelch has been set or not (step $c_{44}$). When no code squelch is set, the muting by the muting means 120 is cancelled (step $c_{45}$) and the flag in the line connection memory area 121 is reset (step $c_{46}$). When the code squelch has been set in step $c_{44}$, step $c_{46}$ is executed after step $c_{44}$ The line connection display device 146 is lit off (step $c_{47}$) after step $c_{46}$. The transmission/reception routine is ended and the processing routine is returned to "START".

When the reset switch 139 is ON in step $c_{34}$, namely, when the reset is instructed, step $c_{46}$ is executed subsequent to step $c_{34}$.

When the flag in the line connection memory area 121 has been reset in step $c_{33}$, a check is made to see if the reverse state setting means 148 has been set or not (step $c_{76}$). When the group code in the input data coincides with the group code (A) in step $c_{38}$, or when the group code in the input data coincides with the group code (B) in step $c_{40}$, the third timer 147 starts timing (step $c_{75}$) after steps $c_{38}$ and $c_{40}$. Then, step $c_{76}$ is executed. When the timing operation is started in step $c_{75}$, the third timer is reset and restarts timing from the beginning.

When the reverse state setting means 148 has been set in step $c_{76}$, the state of the flag in the reverse state memory area 149 is detected (step $c_{48}$). When the flag in the reverse state memory area 149 has been set, the frequency data stored in the idle channel data memory area 136 is loaded into the frequency data memory area 122 (step $c_{49}$). When the flag in the reverse state memory area 136 has been reset, the frequency data stored in the S channel data memory area 123 is loaded into the frequency data memory area 122 (step $c_{50}$). The state of the flag in the reverse state memory area 136 is inverted (step $c_{51}$) subsequent to steps $c_{49}$ and $c_{50}$. In step $c_{48}$, when the flag in the reverse state memory area has been reset, the idle channel data is stored in the frequency data memory area 122. When the flag has been set, the S channel data is stored in the frequency data memory area 122. Due to the execution of steps $c_{49}$ and $c_{50}$, the memory content of the frequency data memory area 122 is replaced between the idle channel data and the S channel data. Therefore, if the distant side doesn't respond in spite of the fact that the line was connected from the transmission side, it is possible to detect whether or not the frequency was returned to the frequency corresponding to the S channel data or the like.

On one hand, in step $c_{51}$, the content of the reverse state memory area 149 is set to the state corresponding to the memory content (idle channel data or S channel data) of the frequency data memory area 122.

Subsequent to step $c_{51}$, a check is made to see if the input data exists or not (step $c_{52}$). When no input data exists, the transmission/reception routine is ended and the processing routine is returned to "START" When the reverse state setting means 148 is not set in step $c_{76}$, step $c_{52}$ is executed after step $c_{76}$. When the input data exists in step $c_{52}$, the input data is decoded (step $c_{53}$). A check is then made to see if the group code (A) has been selected or not (step $c_{54}$). When the group code (A) has been selected, a check is made to see if the group code in the input data coincides with the group code (A) or not (step $c_{55}$). When the group code in the input data coincides with the group code (A) in step $c_{55}$, the group code (A) is displayed in the data display means 112 (step $c_{58}$). A check is then made to see if the apparatus has been set into the system operating state or not (step $c_{60}$).

When the group code (A) is not selected in step $c_{54}$, or when the group code in the input data doesn't coincide with the group code (A) in step $c_{55}$, a check is made to see if the group code (B) has been selected or not (step $c_{56}$) subsequent to steps $c_{54}$ and $c_{55}$. When the group code (B) has been selected, a check is made to see if the group code in the input data coincides with the group code (B) or not (step $c_{57}$). When the group code in the input data coincides with the group code (B) in step $c_{57}$, the group code (B) is displayed in the data display device 112 (step $c_{59}$) after step $c_{57}$. Step $c_{60}$ is executed subsequent to steps $c_{56}$ and $c_{57}$. When the group code (B) is not selected in steps $c_{56}$ and $c_{57}$, or when the group code in the input data doesn't coincide with the group code (B), subsequent to steps $c_{56}$ and $c_{57}$, the transmission/ reception routine is ended and the processing routine is returned to "START". A check is made in step $c_{71}$ to see if the frequency data in the input data is the special data or not. When it is the special data, step $c_{70}$ is executed after step $c_{71}$. When it is not the special data, step $c_{60}$ is executed.

When the apparatus has been set to the system operating state in step $c_{60}$, a check is made to see if the frequency corresponding to the idle channel data in the input data is the frequency in the amateur band or not (step $c_{61}$) after step $c_{60}$. When the frequency corresponding to the idle channel data in the input data is not the frequency in the amateur band in step $c_{61}$, the transmission/reception routine is ended subsequent to step $c_{61}$ and the processing routine is returned to "START".

When the frequency corresponding to the idle channel data in the input data is the frequency in the amateur band in step $c_{61}$, a check is made to see if the idle channel data in the input data coincides with the frequency data in an $f_5$ data memory area (not shown) which is provided in the RAM 83 and in which the $f_5$ frequency data corresponding to the frequency that should not be set into the receiving mode is stored (step $c_{62}$). When they don't coincide, the state of the flag in the line connection memory area is detected (step $c_{63}$). When they coincide, the transmission/ reception routine is ended and the processing routine is returned to "START".

When the flag in the line connection memory area 121 has been reset in step $c_{63}$, namely, when the line isn't connected, the frequency data in the frequency data memory area 122 is loaded into the S channel data memory area 123 (step $c_{64}$). The idle channel frequency data in the input data is then loaded into the frequency data memory area 122 (step $c_{65}$). Thus, the apparatus is set to the frequency corresponding to the idle channel data in the input data. The call sign in the input data is displayed in the data display device 112 (step $c_{66}$) after step $c_{65}$.

Subsequent to step $c_{66}$, the flag in the reverse state memory area 149 is reset (step $c_{67}$). The flag in the line connection memory area 121 is set (step $c_{68}$). The line connection display device 146 is lit on (step $c_z$). The third timer 147 starts timing (step $c_{69}$).

Subsequent to step $c_{69}$, a check is made to see if the code squelch has been set or not (step $c_{70}$) When no code squelch is set, the transmission/reception routine is ended and the processing routine is returned to "START". When the flag in the line connection memory area 121 has been set in step $c_{63}$, step $c_{70}$ is executed after step $c_{63}$. On one hand, when the apparatus is not set to the system operating state in step $c_{60}$, the transmission/reception routine is ended and the processing routine is returned to "START".

When the code squelch has been set in step $c_{70}$, the code squelch is cancelled (step $c_{72}$). The code squelch display device 151 is lit off (step $c_{73}$). The muting by the muting means 120 is cancelled (step $c_{74}$). The transmission/reception routine is finished and the processing routine is returned to "START".

In the reception, the code squelch is cancelled and the muting is cancelled when the input data exists and the group code coincides with the group code transmitted and the apparatus is unrelated to the system operating state and also the idle channel frequency data in the input data is the special data, or when the input data exists and the group code coincides with the group code transmitted and the apparatus is in the system operating state and the frequency corresponding to the idle channel frequency data in the input data is the frequency in the amateur band and is not the frequency data corresponding to the frequency $f_5$.

Steps $c_{33}$ to $c_{74}$ to $c_{76}$ correspond to the reception routine.

We claim:

1. A transceiver comprising:
   a register for storing a code of representing a frequency,
   a transmitter for transmitting a signal at a channel frequency determined by the code set in said register;
   means in response to a manual operation for generating an instruction signal indicative of a changeover of transmission channel frequency; and
   control means responsive to a calling instruction for setting a code of representing a start channel frequency in said register so that said transmitter transmits a signal including a shift channel frequency information at the start channel frequency and thereafter for shifting and transmitted into the shift channel frequency to be in a transmission/reception state;
   wherein said control means responsive to the transmission channel frequency changeover instruction changes over the contents of said register from the code of representing the start channel frequency to the code of representing the shift channel frequency or from the code of representing the shift channel frequency to the code of representing the start channel frequency.

2. A transceiver according to claim 1, wherein said start channel frequency is predetermined and said shift channel frequency is selected among idle channel frequencies.

* * * * *